(12) United States Patent
Kuroiwa et al.

(10) Patent No.: US 7,930,431 B2
(45) Date of Patent: Apr. 19, 2011

(54) CONTENTS USING METHOD, CONTENTS USING SYSTEM, CONTENTS USING PROGRAM, AND SERVER AND ELECTRONIC DEVICE USED IN SAME SYSTEM

(75) Inventors: Minoru Kuroiwa, Tokyo (JP); Kouji Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 2025 days.

(21) Appl. No.: 10/430,315

(22) Filed: May 7, 2003

(65) Prior Publication Data

US 2003/0217057 A1    Nov. 20, 2003

(30) Foreign Application Priority Data

May 17, 2002    (JP) ................... 2002-143875

(51) Int. Cl.
*G06F 17/30*    (2006.01)
(52) U.S. Cl. .................. 709/246; 709/231; 709/232
(58) Field of Classification Search .................. 709/246, 709/231, 232
See application file for complete search history.

(56) References Cited

U.S. PATENT DOCUMENTS

2002/0059596 A1* 5/2002 Sano et al. ................. 725/39
2002/0150228 A1* 10/2002 Umeda et al. ............ 379/220.01
2002/0150387 A1* 10/2002 Kunii et al. .................. 386/83

FOREIGN PATENT DOCUMENTS

| JP | 9-185570 | 7/1997 |
| JP | 2001-218270 | 8/2001 |
| JP | 2001-346141 | 12/2001 |
| JP | 2002-84524 | 3/2002 |

OTHER PUBLICATIONS

Chinese Office Action, dated Jun. 10, 2005, with English translation.
"Computer Applications", vol. 19, No. 2, Feb. 1999, pp. 1-2.

* cited by examiner

*Primary Examiner* — John Follansbee
*Assistant Examiner* — Nghi V Tran
(74) *Attorney, Agent, or Firm* — McGinn IP Law Group, PLLC

(57) ABSTRACT

A contents using method is provided that enables a user to watch and listen to freely same contents by a simple operation by either of an image display device or a server and enables the user to use the server for other applications without a need for paying attention to transfer of an image file from the server to an electronic device. The contents using method includes a first step of storing contents by the server at a date and at a time both being designated by the user, a second step of converting quality of contents by the server according to storage capacity or display capability of a storage section and a display section making up a PDA (Personal Digital Assistant), and a third step of transferring contents obtained after the quality conversion, after having confirmed connection between the server and the PDA, from the server to the PDA.

77 Claims, 21 Drawing Sheets

*TDF1; divided file information table*

| name of divided file | head time | end time | converted flag |
|---|---|---|---|
| DFN1 | 1:00 | 1:10 | 0 |
| DFN2 | 1:10 | 1:20 | 0 |
| ⋮ | ⋮ | ⋮ | ⋮ |
| DFN10 | 2:30 | 2:40 | 0 |

FIG.17

FDF1;divided file information table

| name of divided file | transferred flag |
|---|---|
| DFN1 | 0 |
| DFN2 | 0 |
| ... | ... |
| DFN10 | 0 |

FIG.18

SPM;program managing table

| name of program | reproduction point |
|---|---|
| WBS(2002/4/15) | 10 min 5 sec |
| WBS(2002/4/16) | 0 min 0 sec |
| ... | ... |

FIG.22

*DR; deleting order table*

| genre | deleting order |
|---|---|
| news | high |
| sports | middle |
| drama | automatic deletion disabled |
| other | low |
| ... | ... |

FIG.23

*CPM2; program managing table*

| name of program | genre |
|---|---|
| WBS(2002/4/15) | news |
|  |  |
|  |  |
| ... | ... |

CONTENTS USING METHOD, CONTENTS USING SYSTEM, CONTENTS USING PROGRAM, AND SERVER AND ELECTRONIC DEVICE USED IN SAME SYSTEM

BACKGROUND OF THE INVENTION

1. Field of the Invention

The present invention relates to a contents using method, a contents using system, a contents using program, and a server and electronic device used in a same system and more particularly to the contents using method in which, contents such as image data or a like, after having been stored by the server, are transferred to the electronic device and are reproduced by the electronic device, to the contents using system to which the above contents using method is applied, to the contents using program to have a computer implement the above contents using method, and to the server and the electronic device making up the same system.

The present application claims priority of Japanese Patent Application No. 2002-143875 filed on May 17, 2002, which is hereby incorporated by reference.

2. Description of the Related Art

A conventional contents using system chiefly includes a server such as a personal computer, workstation, or a like and a portable electronic device. The server employed in the conventional contents using system has a television broadcast receiving function of, after having performed signal processing on a broadcast wave or a CATV (Community Antenna TeleVision) signal received by an antenna, displaying its image on a display unit or outputting its amplified voice from a speaker. The portable electronic device refers to an electronic device to which power is supplied by a battery, dry cell, or a like, including a computer such as a notebook-type computer, a palm-size-type computer, a pocket-type computer, or a like, a PDA (Personal Digital Assistant), a portable cellular phone, a PHS (Personal Handy-Phone System) or a like. These portable electronic devices, though not having a television broadcast receiving function, have a reproducing function of displaying an image on a display unit by receiving image data through a cable, storage medium, or a like, and/or of outputting an amplified voice from a speaker. All servers to be explained thereafter are described on premises that they have the above-mentioned television broadcast receiving function and all portable electronic devices to be explained thereafter are also described on premises that they have the above-mentioned reproduction function.

In the above contents using system, conventionally, a user, when reproducing contents of image data of a television program or a like by using a portable electronic device, have to take procedures shown below. First, the user instructs a server to start a contents recording program and performs processing of presetting the contents using system to record contents that the user wants to watch and listen to and then has a storage device such as a hard disk or a like being embedded in the server or being added externally to the server store an image file of the contents.

Next, the user instructs the server to start a data format converting program in order to convert a data format and/or a data size of an image file of the contents being stored in the above storage device to a data format and/or a data size that can be reproduced by the portable electronic device. Since this causes the server to read the image file, the user checks, by operating the portable electronic device, a data format and/or a data size that can be reproduced by the portable electronic device and changes setting of the data format converting program based on a result from the checking process.

Therefore, the sever, after having converted a data format of an image file or a like according to change in setting made by the user, once stores the image file obtained by the conversion into a small-sized storage medium such as a flexible disk, SD (Secure Digital) memory card (trademark), memory stick (trademark) or a like. Then, the user, after having taken out the small-sized storage medium in which the image file obtained by the conversion are stored from the server and having inserted it into the portable electronic device, stores the image file obtained by the conversion into a storage device embedded in the portable electronic device and runs the contents reproducing program being stored in the storage device also embedded in the portable electronic device to reproduce the contents.

As described above, in the conventional contents using system, when the contents of image data such as a television program or a like are reproduced by the portable electronic device, the user has to perform various complicated procedures, which requires time and labor and which causes inconvenience as explained below.

Since the storage device embedded in the portable electronic device has too small a capacity to store an image file, in order to store a new image file in the storage device, it is necessary to delete image files or a like that have been stored before. In this case, since the user has to delete an image file while checking the image files or the like having been already stored in the above storage device one by one, it takes much time and there is a danger of deleting, by mistake, image files or a like that are needed.

Moreover, since there is a big difference in storage capacity between the storage device embedded in a server or added externally to the server and the storage device embedded in the portable electronic device, by converting a data format of the image file to a data format having a high image compression rate, it is necessary to make smaller a data size of an image file to be stored in the storage device embedded in the portable electronic device. An image compression method includes, for example, MPEG-2 or MPEG-4 recommended by MPEG (Moving Picture Expert Group) of ISO (International Organization for Standardization). The MPEG-2 (bit rate: 1 Mbps to 100 Mbps) is a specification being targeted on a high-level image and voice quality to be used in broadcasting, while the MPEG-4 is a specification (bit rate: up to 10 Mbps) made such that it may be applied to a multimedia, the Internet, and a mobile communication device in the future.

It is assumed that, after an image file is stored in a data format of the MPEG-2 in the storage device embedded in the server or added externally to the server, the image file is converted to a data format of the MPEG-4 and is then stored in the storage device embedded in the portable electronic device. The server has to make the conversion of the data format from the MPEG-2 to the MPEG-4, however, since it takes about one hour to convert an image file for a two hour television program from the data format of the MPEG-2 to the data format of the MPEG-4, a big load is put on a CPU (Central Processing Unit) making up the server. As a result, a problem arises that, when the user wants to use the server, an application program other than the data format converting program substantially becomes unusable.

Moreover, in the conventional contents using system, when the user, after having watched, to some midpoint, a program of which broadcasting time is comparatively long, for example, a movie, a drama, or a live program of sport having a long broadcasting time by using the portable electronic device, again wants to watch the same program from a point where he/she discontinued watching the program, he/she cannot watch the program unless its recorded image file is fast-forwarded to the point where he/she discontinued watching it from a point where he/she begun watching it. Also, in the conventional contents using system, if the user, after having watched, to some midpoint, a program by using the portable electronic device, wants to watch the same program by using the server from the point where he/she discontinued watching the program, or if the user, having watched, to some midpoint, the program by using the server, watches the same program by using the portable electronic device from the point where he/she discontinued watching the program, he/she cannot watch the program unless he/she manipulates the server or the portable electronic device to have an image file fast-forwarded to the point where he/she discontinued watching it from a start point of the image file.

The inconvenience described above also occurs not only in the portable cellular phone but also in a stationary-type electronic device whose storage device has small storage capacity and which, though not having the television broadcast receiving function, has such the reproducing function as explained above. An electronic device of this kind includes a personal computer or workstation having the television broadcast receiving function.

SUMMARY OF THE INVENTION

In view of the above, it is an object of the present invention to provide a contents using method that enables a user to watch freely contents by a simple operation by either of an electronic device or a server and enables the user to use the server for other applications without a need for paying attention to transfer of an image file from the server to the electronic device. It is another object of the present invention to provide a contents using system to which the contents using method is applied. It is still another object of the present invention to provide a contents using program to have a computer implement the above contents using method. It is a further object of the present invention to provide a server and a electronic device making up the above system.

According to a first aspect of the present invention, there is provided a contents using method including:
   a first step of storing contents by a server at a date and at a time both being designated by a user;
   a second step of converting quality of the contents by the server according to storage capacity or display capability of a storage section and display section making up an electronic device; and
   a third step of transferring, after having confirmed connection between the server and the electronic device, contents obtained after the quality conversion, from the server to the electronic device.

In the foregoing first aspect, a preferable mode is one wherein the server and the electronic device are connected to each other through a cable, by wireless, or via a network.

Also, a preferable mode is one wherein the electronic device includes a portable electronic device to which power is supplied by a battery, a dry cell, a solar cell or a fuel cell.

Also, a preferable mode is one wherein the electronic device is made up of a first electronic device having the display section and a second electronic device having a controlling section to store contents obtained after the quality conversion transferred from the storage section and the server in the storage section and to display the contents on the display section.

Also, a preferable mode is one wherein the electronic device is made up of a first electronic device having the display section and the storage section and a second electronic device having a controlling section to store contents obtained after the quality conversion and transferred from the server in the storage section and to display the contents on the display section.

Also, a preferable mode is one wherein the server and the electronic device are connected to each other through a cradle serving as a platform having a function of connecting the electronic device to the server to carry out a data exchange and wherein, in the third step, the server, after having confirmed that the electronic device has been inserted into the cradle, transfers contents obtained after the quality conversion to the electronic device.

Also, a preferable mode is one wherein, in the second step, the storage capacity and the display capability are acquired as a result of having been pre-input in the electronic device by the user or as a result of having displayed contents serving as a sample which have been transferred to the electronic device and have been displayed on the display section when the server was first connected to the electronic device.

Also, a preferable mode is one wherein, in the first step, storage presetting information about presetting of storing the contents is input into the electronic device and the electronic device transfers the storage presetting information to the server and the server stores the contents based on the storage presetting information.

Also, a preferable mode is one wherein, in the first step, the server transfers a contents acquiring schedule table needed to input the storage presetting information to the electronic device and the storage presetting information is input based on the contents acquiring schedule table in the electronic device.

Also, a preferable mode is one wherein the storage presetting information contains at least one of information about a name of the contents, storage starting date and time, storage terminating date and time, transfer flag indicating whether or not transfer is needed, identification number of a destination to which transfer is made which designates the destination to which transfer is made, and quality conversion of the contents.

Also, a preferable mode is one wherein, when a plurality of the electronic devices exists and a device identification number is assigned to each of the electronic devices, the storage presetting information contains the device identification number and wherein, in the third step, contents obtained after the quality conversion is transferred only to the electronic devices to which the device identification numbers have been assigned.

Also, a preferable mode is one wherein, when a plurality of the users exists and a user identification number is assigned to each of the users, the storage presetting information contains the user identification numbers and wherein, in the third step, contents obtained after the quality conversion are transferred only to the electronic device to which the storage presetting information containing the user identification numbers have been transferred in the first step.

Also, a preferable mode is one wherein, when the electronic device is constructed so that a plurality of the storage sections is freely detachable and attachable and a storage section identification number set by the user for each of the storage sections is assigned to the storage section, the storage presetting information contains the storage section identification number and, in the third step, contents obtained after the quality conversion are transferred only to the electronic devices each being equipped with the storage section to which the storage section identification number has been assigned.

Also, a preferable mode is one wherein, in the second step, when a plurality of information about the quality conversion exists for the contents having same contents, quality of the contents is converted so as to have the highest quality.

Also, a preferable mode is one wherein, in the second step, the server converts quality of the contents during a conversion enabling time band being not used by the user.

Also, a preferable mode is one wherein the conversion enabling time band is set by the user in advance, or by the server based on a state of use of the server by the user in a past, or by the server based on a time band set in advance by the user and the state of use of the server.

Also, a preferable mode is one wherein, in the second step, the server starts the conversion of quality of the contents from a conversion start enabling date and time being the earliest date and time at which time being expected to be required for the conversion of quality of the contents is able to be secured.

Also, a preferable mode is one wherein, in the first step, the contents are divided into a plurality of elements and stored and wherein, in the second step, quality of the plurality of the elements is sequentially converted, and wherein, in the third step, the plurality of elements obtained after the quality conversion is sequentially transferred from the server to the electronic device.

Also, a preferable mode is one wherein, in the second step, when the conversion of quality of an arbitrary one of the plurality of elements is discontinued while quality of the plurality of elements is being sequentially converted, the conversion of quality is restarted from the arbitrary one from which the conversion had been discontinued after a normal operation is restored.

Also, a preferable mode is one wherein, in the second step, when the conversion of quality of an arbitrary one of the plurality of elements becomes successful, the arbitrary one being stored in the server is deleted.

Also, a preferable mode is one wherein, in the third step, when transfer of an arbitrary one of the plurality of elements is discontinued while the plurality of the elements obtained after the quality conversion is sequentially transferred, the transfer is restarted from the arbitrary one from which the transfer had been discontinued after a normal operation is restored.

Also, a preferable mode is one wherein, in the third step, when the transfer of an arbitrary element of the plurality of elements becomes successful, the arbitrary one being stored in the server is deleted.

Also, a preferable mode is one wherein, in the third step, when a free disk space of the storage capacity is not enough to store the contents or the elements, the contents or the elements to be deleted under specified conditions set in advance are sequentially selected and deleted, out of a plurality of the contents or the elements being stored in the storage section, until the free disk space of the storage capacity is increased so as to become enough to store the contents or the elements.

Also, a preferable mode is one wherein, in the third step, when a free disk space of the storage capacity is not enough to store the contents or the elements, the contents or the elements to be transferred under specified conditions set in advance are sequentially selected and transferred, out of a plurality of the contents or the elements being stored in the storage section, until the free disk space of the storage capacity is increased so as to become enough to store the contents or the elements.

Also, a preferable mode is one wherein, in the third step, when a free disk space of the storage capacity is not enough to store the contents or the elements, part of a plurality of the contents or the elements being stored in the storage section is sequentially displayed on the display section or a display section of the server and the contents or the elements being sequentially selected by the user are sequentially deleted until the free disk space of the storage capacity is increased so as to become enough to store the contents or the elements.

Also, a preferable mode is one wherein, in the third step, when a free disk space of the storage capacity is not enough to store the contents or the elements, the contents or the elements having same contents as the contents or the elements being stored in the server, out of a plurality of the contents or the elements being stored in the storage section, are sequentially selected for deletion until the free disk space of the storage capacity is increased so as to become enough to store the contents or the elements.

Also, a preferable mode is one wherein, in the third step, when a free disk space of the storage capacity is not enough to store the contents or the elements, the contents or the elements to be deleted based on predetermined conditions set in advance are sequentially selected for deletion, out of a plurality of the contents or the elements having been reproduced and being stored in the storage section of the electronic device, until the free disk space of the storage capacity is increased so as to become enough to store the contents or the elements.

Also, a preferable mode is one wherein a transfer completion date and time at which the transfer of the contents and the elements is completed is configured so as to be capable of being set by the user and wherein, in the second step, the server calculates time required for the transfer and for the quality conversion by performing an inverse operation from the transfer completion date and time and sets a quality conversion starting date and time at which the conversion of quality is started, and starts the conversion of quality of the contents or the elements at the set quality conversion starting date and time.

Also, a preferable mode is one wherein, in the second step, when use of the server by the user is detected, the server does not start or discontinues the conversion of quality of the contents and the elements.

Also, a preferable mode is one wherein, in the second step, when use of the server by the user is not detected for a period of time exceeding a predetermined time, the server starts or restarts the conversion of quality of the contents or the elements.

Also, a preferable mode is one wherein, in the third step, when use of the server by the user is detected, the server does not start or discontinues transfer of the contents or the elements obtained after the quality conversion.

Also, a preferable mode is one wherein, in the third step, when use of the server by the user is not detected for a period of time exceeding a predetermined time, the server starts or restarts transfer of the contents or the elements obtained after the quality conversion.

Also, a preferable mode is one wherein use of the server by the user is judged or confirmed by identifying the user, by detecting a fact that an operating section of the server has been manipulated by the user, or by detecting an intention of the server to use the server.

Also, a preferable mode is one wherein, in the second or the third step, the quality conversion of the contents or the elements, or transfer of the contents or the elements obtained after the quality conversion is stopped or discontinued when a load on a controlling section of the server exceeds a threshold value for a first period of time within a first predetermined period, and is started or restarted when the load on the controlling section becomes less than a threshold value for a second period of time within a second predetermined period.

Also, a preferable mode is one wherein the server is so constructed that the contents or the elements are able to be reproduced and wherein, in the third step, the server transfers the contents or the elements obtained after the quality conversion and a reproduction point of the contents or the elements obtained after the quality conversion to the electronic device and wherein a fourth step is included in which the contents or the elements obtained after the quality conversion are reproduced from the reproduction point by the electronic device.

Also, a preferable mode is one that wherein, further includes a fifth step of transferring, when the contents or the elements having same contents as the contents or the element being stored in the storage section of the electronic device are stored in the storage section of the server at a time when the server is connected to the electronic device, the reproduction point currently existing from the electronic device to the server and of storing the reproduction point currently existing in the storage section of the server or of renewing the reproduction point.

Also, a preferable mode is one wherein the portable electronic device includes a notebook-type, a palm-size-type, a pocket-type computer, a PDA (Personal Digital Assistant), a portable cellular phone, or a PHS (Personal Handy-phone System).

According to a second aspect of the present invention, there is provided a contents using system including:

a server to store contents and to transfer the contents to an electronic device and to reproduce the contents by the electronic device;

wherein the server stores the contents at a date and at a time both being designated by a user, converts quality of the contents according to storage capacity or display capability of a storage section and display section making up the electronic device, and transfers, after having confirmed connection between the server and the electronic device, the contents obtained after the quality conversion, from the server to the electronic device.

In the foregoing second aspect, a preferable mode is one wherein the server and the electronic device are connected to each other through a cable, by wireless, or via a network.

Also, a preferable mode is one wherein the electronic device includes a portable electronic device to which power is supplied by a battery, a dry cell, a solar cell or a fuel cell.

Also, a preferable mode is one wherein the electronic device is made up of a first electronic device having the display section and a second electronic device having a controlling section to store contents obtained after the quality conversion and transferred from the storage section and the server in the storage section and to display the contents on the display section.

Also, a preferable mode is one wherein the electronic device is made up of a first electronic device having the display section and the storage section and a second electronic device having a controlling section to store contents obtained after the quality conversion and transferred from the server in the storage section and to display the contents on the display section.

Also, a preferable mode is one wherein the server and the electronic device are connected to each other through a cradle serving as a platform having a function of connecting the electronic device to the server to carry out a data exchange and wherein the server, after having confirmed that the electronic device has been inserted into the cradle, transfers contents obtained after the quality conversion to the electronic device.

Also, a preferable mode is one wherein the storage capacity and the display capability are acquired as a result of pre-inputting by the user or as a result of displaying contents serving as a sample which have been transferred to the electronic device and have been displayed on the display section when the server was first connected to the electronic device.

Also, a preferable mode is one wherein the electronic device transfers storage presetting information about presetting of storing the contents input by the user and the server stores the contents based on the storage presetting information.

Also, a preferable mode is one wherein the server transfers a contents acquiring schedule table needed to input the storage presetting information to the electronic device and the electronic device transfers the storage presetting information input by the user who made reference to the contents acquiring schedule table.

Also, a preferable mode is one wherein the storage presetting information contains at least one of information about a name of the contents, storage starting date and time, storage terminating date and time, transfer flag indicating whether or not transfer is needed, identification number of a destination to which transfer is made which designates the destination to which transfer is made, and quality conversion of the contents.

Also, a preferable mode is one wherein, when a plurality of the electronic devices exists and a device identification number is assigned to each of electronic devices, the storage presetting information contains the device identification numbers and wherein the server transfers contents obtained after the quality conversion only to the electronic devices to which the device identification numbers have been assigned.

Also, a preferable mode is one wherein, when a plurality of the users exists and a user identification number is assigned to each of the users, the storage presetting information contains the user identification numbers and wherein the server transfers contents obtained after the quality conversion only to the electronic device to which the storage presetting information containing the user identification numbers have been transferred.

Also, a preferable mode is one wherein, when the electronic device is configured so that a plurality of the storage sections is freely detachable and attachable and a storage section identification number set by the user for each of the storage sections is assigned to the storage section, the storage presetting information contains the storage section identification numbers and the server transfers contents obtained after the quality conversion only to the electronic devices each being equipped with the storage section to which the storage section identification number has been assigned.

Also, a preferable mode is one wherein, when a plurality of information about the quality conversion exists for the contents having same contents, quality of the contents is converted so as to have the highest quality.

Also, a preferable mode is one wherein the server converts quality of the contents during a conversion enabling time band being not used by the user.

Also, a preferable mode is one wherein the conversion enabling time band is set by the user in advance, or by the server based on a state of use of the server by the user in a past, or by the server based on a time band set in advance by the user and the state of use of the server.

Also, a preferable mode is one wherein the server starts the conversion of quality of the contents from a conversion start enabling date and time being the earliest date and time at which time being expected to be required for the conversion of quality of the contents is able to be secured.

Also, a preferable mode is one wherein the server divides the contents into a plurality of elements, stores them, sequentially converts quality of the plurality of the elements, and sequentially transfers the plurality of the elements obtained after the quality conversion, from the server to the electronic device.

Also, a preferable mode is one wherein, when the conversion of quality of an arbitrary one of the plurality of elements is discontinued while quality of the plurality of the elements is being sequentially converted, the conversion of quality is restarted from the arbitrary one from which the conversion had been discontinued, after the normal operation is restored.

Also, a preferable mode is one wherein the server, when the conversion of quality of an arbitrary one of the plurality of elements becomes successful, deletes the arbitrary one being stored in the storage section of the server.

Also, a preferable mode is one wherein the server, when transfer of an arbitrary one of the plurality of elements is discontinued while the plurality of the elements obtained after the quality conversion is sequentially transferred, restarts the transfer from the arbitrary one from which the transfer had been discontinued, after the normal operation is restored.

Also, a preferable mode is one wherein the server, when the transfer of an arbitrary one of the plurality of elements becomes successful, deletes the arbitrary one being stored in the storage section of the server.

Also, a preferable mode is one wherein the server, when a free disk space of the storage capacity is not enough to store the contents or the elements, sequentially selects and deletes the contents or the elements to be deleted under specified conditions set in advance, out of a plurality of the contents or the elements being stored in the storage section of the electronic device, until the free disk space of the storage capacity is increased so as to become enough to store the contents or the elements.

Also, a preferable mode is one wherein the server, when a free disk space of the storage capacity is not enough to store the contents or the elements, sequentially selects the contents or the elements to be transferred to the server itself under specified conditions set in advance so as to be transferred to the server itself, out of a plurality of the contents or the elements being stored in the storage section of the electronic device, until the free disk space of the storage capacity is increased so as to become enough to store the contents or the elements.

Also, a preferable mode is one wherein the server, when a free disk space of the storage capacity is not enough to store the contents or the elements, sequentially displays part of a plurality of the contents or the elements being stored in the storage section of the electronic device on the display section or a display section of the server itself and sequentially deletes the contents or the elements being sequentially selected by the user until the free disk space of the storage capacity is increased so as to become enough to store the contents or the elements.

Also, a preferable mode is one wherein the sever, when a free disk space of the storage capacity is not enough to store the contents or the elements, sequentially selects and deletes the contents or the elements having same contents as the contents or the elements being stored in a storage section of the server itself, out of a plurality of the contents or the elements being stored in the storage section of the electronic device, until the free disk space of the storage capacity is increased so as to become enough to store the contents or the elements.

Also, a preferable mode is one wherein the server, when a free disk space of the storage capacity is not enough to store the contents or the elements, sequentially selects and deletes the contents or the elements to be deleted based on specified conditions set in advance, out of a plurality of the contents or the elements having been reproduced and being stored in the storage section of the electronic device, until the free disk space of the storage capacity is increased so as to become enough to store the contents or the elements.

Also, a preferable mode is one wherein a transfer completion date and time at which the transfer of the contents and the elements is completed is configured so as to be capable of being set by the user and wherein, the server calculates time required for the transfer and for the quality conversion by performing an inverse operation from the transfer completion date and time and sets a quality conversion starting date and time at which the conversion of quality is started, and starts the conversion of quality of the contents or the elements at the set quality conversion starting date and time.

Also, a preferable mode is one wherein the server, when use of the server by the user is detected, does not start or discontinues the conversion of quality of the contents and the elements.

Also, a preferable mode is one wherein the server, when use of the server by the user is not detected for a period of time exceeding a predetermined time, starts or restarts the conversion of quality of the contents or the elements.

Also, a preferable mode is one wherein the server, when use of the server by the user is detected, does not start or discontinues transfer of the contents or the elements obtained after the quality conversion.

Also, a preferable mode is one wherein the server, when use of the server by the user is not detected for a period of time exceeding a predetermined time, starts or restarts transfer of the contents or the elements obtained after the quality conversion.

Also, a preferable mode is one wherein the server judges whether or not use of the server by the user, by identifying the user, by detecting a fact that an operating section of the server has been manipulated by the user, or by detecting an intention of the server to use the server.

Also, a preferable mode is one wherein the server stops or discontinues the quality conversion of the contents or elements, or transfer of the contents or the elements obtained after the conversion when a load on a controlling section of the server exceeds a threshold value for a first period of time within a first predetermined period and starts or restarts the quality conversion of the contents or the elements, or transfer of the contents or elements obtained after the quality conversion when the load on the controlling section becomes less than a threshold value for a second period of time within a second predetermined period.

Also, a preferable mode is one wherein the server is so constructed that the contents or the elements are able to be reproduced and wherein the server transfers the contents or the elements obtained after the quality conversion by the server and a reproduction point of the contents or the elements obtained after the quality conversion to the electronic device and wherein the electronic device reproduces the contents or the elements obtained after the quality conversion from the reproduction point.

Also, a preferable mode is one wherein when the contents or the elements having same contents as the contents or the elements being stored in the storage section of the electronic device are stored in the storage section of the server at a time when the server is connected to the electronic device, the server receives a reproduction point currently existing transferred from the electronic device and stores or renews the reproduction point currently existing in the storage section of the server itself.

Also, a preferable mode is one wherein a plurality of the servers is connected through a network and which transfers contents, after having stored them by a server and reproduces the contents by an electronic device.

Also, a preferable mode is one wherein the electronic device is configured so as to be capable of being connected to the network through any one of a plurality of the servers or directly.

Also, a preferable mode is one wherein the portable electronic device includes a notebook-type, a palm-size-type, a pocket-type computer, a PDA (Personal Digital Assistant), a portable cellular phone, or a PHS (Personal Handy-phone System).

According to a third aspect of the present invention, there is provided a server for being used in the contents using system as recited in the above second aspect.

According to a fourth aspect of the present invention, there is provided an electronic device for being used in the contents using system as recited in the above aspect.

According to a fifth aspect of the present invention, there is provided a contents using program to have a computer implement a contents using method including:

a first step of storing contents by a server at a date and at a time both being designated by a user;

a second step of converting quality of the contents by the server according to storage capacity or display capability of a storage section and display section making up an electronic device; and a third step of transferring, after having confirmed connection between the server and the electronic device, contents obtained after the quality conversion, from the server to the electronic device.

With the above configurations, since the contents using method of the present invention includes the first step of storing contents by the server at the date and at the time both being designated by the user, the second step of converting quality of contents by the server according to storage capacity of the storage section and the display section making up the image display device, and the third step of transferring contents obtained by the quality conversion, after having confirmed connection between the server and the image display device, from the server to the image display device, the server can be used for other applications without a need for paying attention to transfer of an image file from the server to the electronic device.

With another configurations, since contents are stored after having been divided into a plurality of elements, quality of a plurality of elements is sequentially converted and a plurality of elements obtained after the quality conversion is sequentially transferred from the server to the image display device, excellent conversion efficiency and transfer efficiency of contents can be achieved and time required for the processing can be shorted.

With still another configuration, since the server is so constructed that contents can be reproduced and since the server transfers both contents obtained after the quality conversion and a reproduction point of contents obtained after the quality conversion by the server to the image display device and contents obtained after the quality conversion can be reproduced from a reproduction point in the image display device, same contents can be watched and listened to freely by either of the image display device or the server.

With still another configuration, if free disk space is not enough to store contents, since contents to be deleted under predetermined conditions preset in advance out of a plurality of contents being stored in the storage section are sequentially deleted until the free disk space is increased and it becomes enough to store contents, even if the image display device has little storage capacity, it is made possible for a user to avoid unintended deletion of files.

With still another configuration, since a plurality of servers is connected to one another through the network and the contents, after having been stored in any one of the servers, are transferred to the image display device in which the contents are reproduced, so long as a network environment is provided, it is possible to capture a file or an element even in an area to which the user has moved.

BRIEF DESCRIPTION OF THE DRAWINGS

The above and other objects, advantages, and features of the present invention will be more apparent from the following description taken in conjunction with the accompanying drawings in which:

FIG. 17 is a diagram showing an example of configurations of a divided file information table employed in the second embodiment of the present invention;

FIG. 18 is a diagram showing an example of configurations of a program managing table being stored in a storage section of a server making up a contents using system employed in a third embodiment of the present invention;

FIG. 22 is a diagram showing an example of a deleting order table being stored in a storage section in a server making up a contents using system of a fourth embodiment of the present invention;

FIG. 23 is a diagram showing an example of a program managing table being stored in a PDA making up the contents using system of the fourth embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
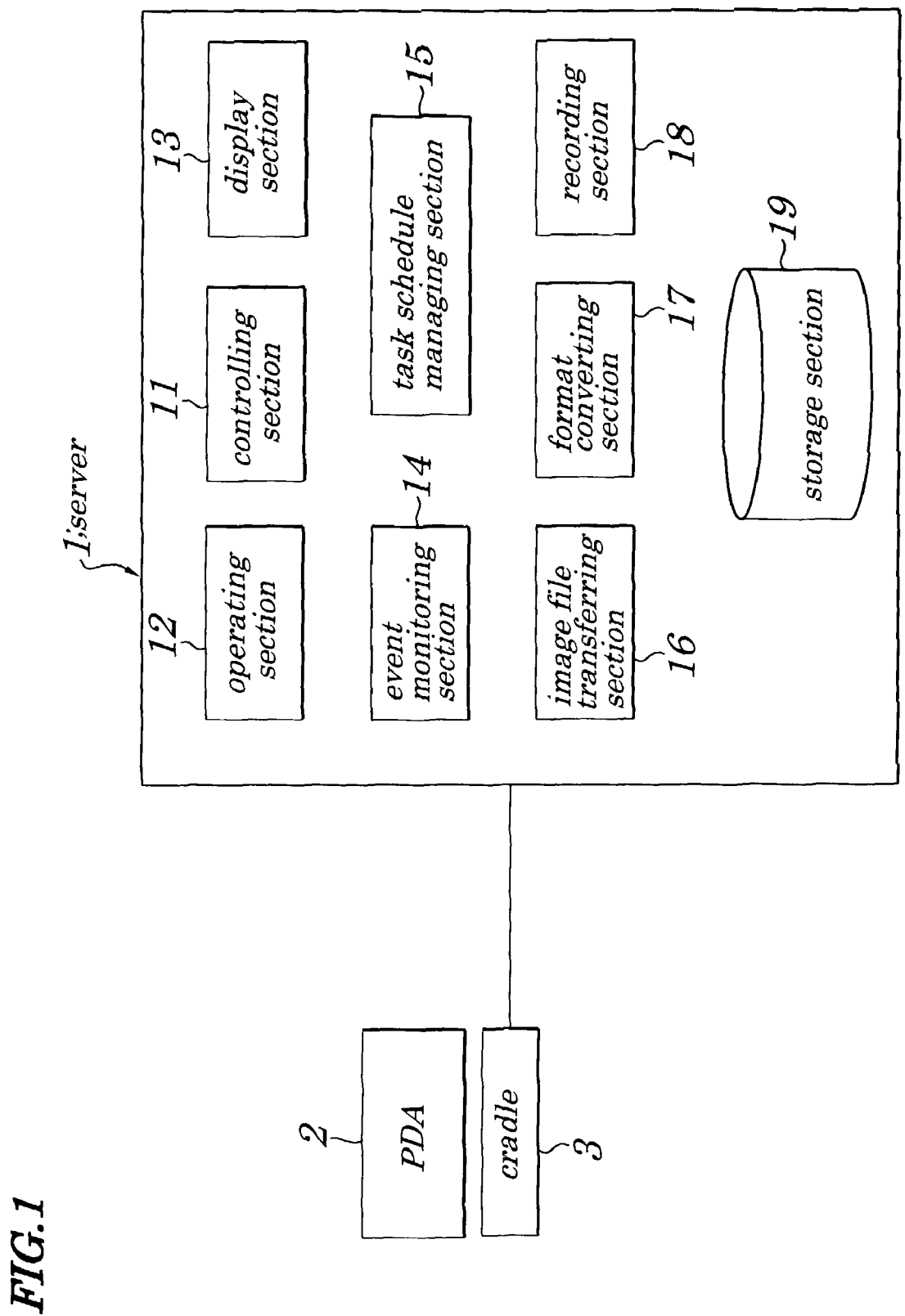
FIG. 1 is a schematic block diagram showing configurations of a contents using system according to a first embodiment of the present invention.

FIG. 1 is a schematic block diagram showing configurations of a contents using system according to a first embodiment of the present invention. The contents using system of the first embodiment includes a server 1 made up of a personal computer, workstation, or a like, a PDA 2 serving as an example of a portable electronic device, and a cradle 3. The cradle 3 represents a platform having functions of charging a battery of the PDA 2 and of connecting the PDA 2 to the server 1 to exchange data. When the PDA 2 is inserted into the cradle 3, charging of the battery being embedded in the PDA 2 is started. An image file and other data are transferred through the cradle 3 from the server 1 and are stored in a storage section (not shown) placed internally in the PDA 2. The PDA 2, as a single unit, has a function of reproducing image files.

The server 1 is made up of a controlling section 11, an operating section 12, a display section 13, an event monitoring section 14, a task schedule managing section 15, an image file transferring section 16, a format converting section 17, a recording section 18, and a storage section 19. Moreover, the server 1 of the embodiment, since it has the above (described in Related Art) television broadcast receiving function, is equipped with a signal processing section to perform signal processing on broadcast waves being received through an antenna or CATV (Community Antenna Tele Vision) signals fed through a CATV cable and with a speaker to output an amplified voice, however, they are not directly related to features of the present invention and are not shown in FIG. 1 accordingly. The controlling section 11 is made up of a CPU (not shown) or a like and executes various programs being stored in the storage section 19 and exerts control on each component of the server 1. The operating section 12 is made up of a keyboard, mouse or a like (not shown). The display section 13 is made up of a CRT (Cathode Ray Tube) display, liquid crystal display, plasma display or a like (not shown). The event monitoring section 14 is controlled by the task schedule managing section 15 and checks whether or not the PDA 2 has been inserted into the cradle 3 at predetermined intervals (for example, at intervals of one minute) and, if the PDA 2 has been inserted by a user into the cradle 3, informs the task schedule managing section 15 of the insertion.

The task schedule managing section 15, when being informed by the event monitoring section 14 that the PDA 2 has been inserted by the user into the cradle 3, makes a request asking the PDA 2 to transfer a user identification (ID) being stored in a predetermined area in the storage section (not shown) in the PDA 2, then judges whether or not the user ID transferred from the PDA 2 matches an ID of a destination to which transfer is made that makes up transfer presetting information described later and, if there is matching, makes a request asking the image file transferring section 16 to transfer an image file being stored in the storage section 19 in the server 1.

The image file transferring section 16, in accordance with the request from the task schedule managing section 15, transfers the image file whose a data format has been converted and which has been stored in the storage section 19 through the cradle 3 to the PDA 2. The format converting section 17 converts a data format of the image file of high image quality and high voice quality (for example, data format of MPEG-2) into a data format that can be reproduced by the PDA 2 (for example, data format of MPEG-4) and again stores the image file in the storage section 19 in the server 1. The recording section 18 stores a television program selected to be recorded by the user into the storage section 19 during a period of time from a recording start time to a recording completion time.

The storage section 19 is made up of a semiconductor memory (not shown) such as a ROM (Read Only Memory), RAM (Random Access Memory), and a like, an FD (Flexible Disk) driver provided with an FD, an HD (Hard Disk) driver provided with an HD, an MO (Magneto-optic) disk driver provided with an MO disk, CD-ROM (Compact Disk Read-Only Memory), CD-R (Compact Disk-Readable), CD-RW (Compact Disk-Re Writable), or a CD/DVD (Compact Disk/Digital Video Disk) driver provided with a DVD-ROM (Digital Video Disk Read-Only Memory), DVD-R (Digital Video Disk-Readable), DVD-RW (Digital Video Disk Read-Only Memory), and a like. The storage section 19 stores, in addition to various programs to be executed by the controlling section 11, various kinds of data, such as image files having high image quality and high voice quality, image files obtained by the conversion described above, a record presetting information list, a conversion presetting information list, a transfer presetting information list, and a like.

Figure 2:
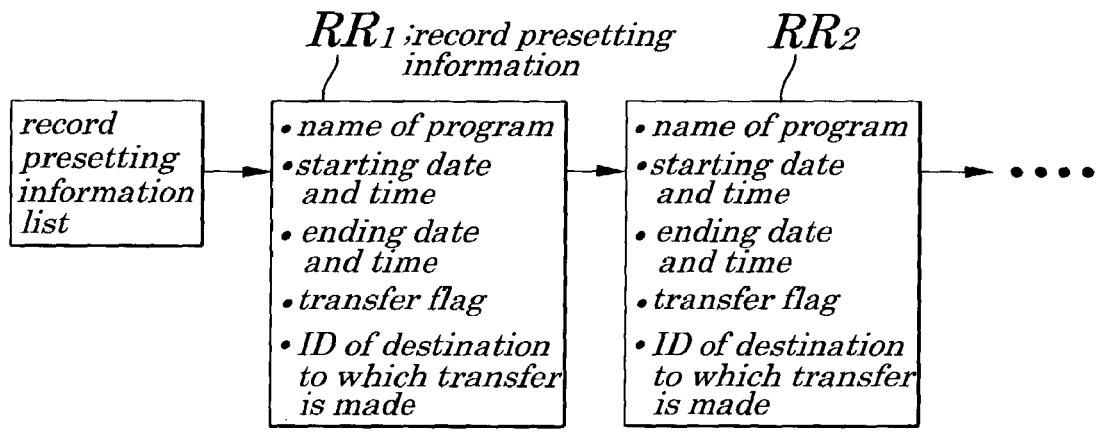
FIG. 2 is a diagram showing an example of a data structure of a record presetting information list employed in the first embodiment of the present invention.
Figure 3:
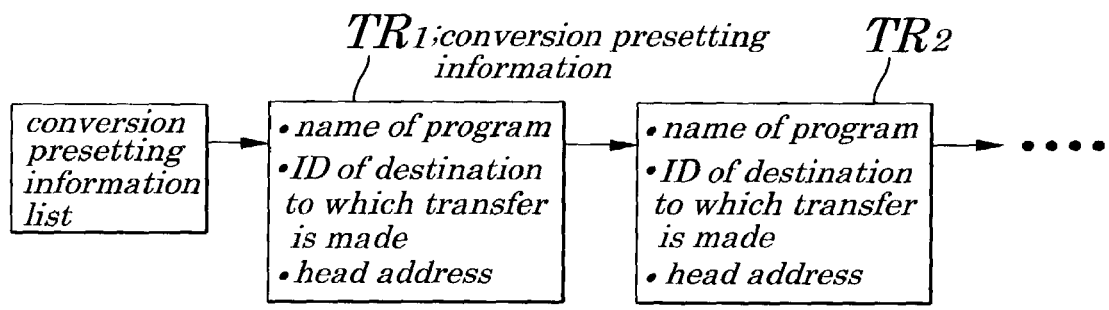
FIG. 3 is a diagram showing an example of a data structure of a conversion presetting information list employed in the first embodiment of the present invention.
Figure 4:
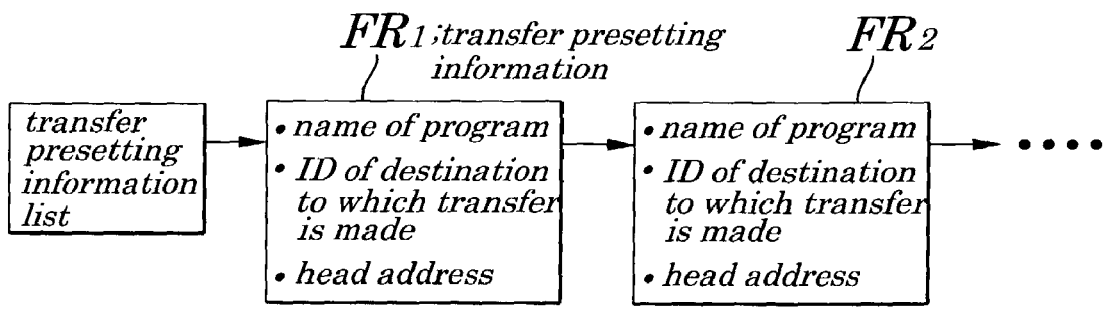
FIG. 4 is a diagram showing an example of a data structure of a transfer presetting information list employed in the first embodiment of the present invention.
Figure 5:
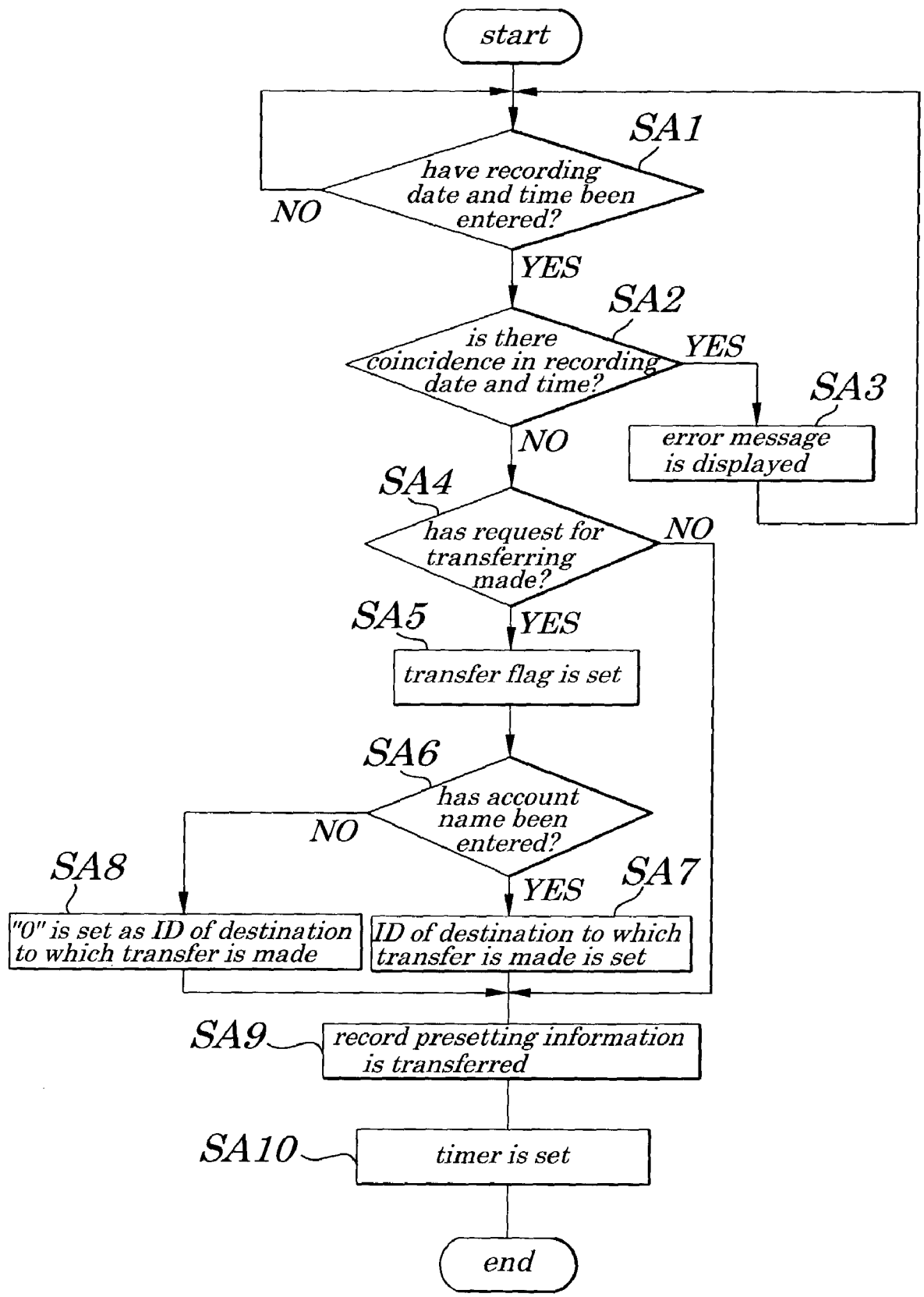
FIG. 5 is a flowchart explaining record presetting processes employed in the first embodiment of the present invention.

FIG. 2 is a diagram showing an example of a data structure of the record presetting information list employed in the first embodiment. FIG. 3 is also a diagram showing an example of a data structure of the conversion presetting information list employed in the first embodiment. FIG. 4 is also a diagram showing an example of a data structure of the transfer presetting information list employed in the first embodiment. The record presetting information list, as shown in FIG. 2, includes a plurality of pieces of record presetting information $RR_1, RR_2, \ldots$, being stored in order of a date and time of presetting for recording. Each of the plurality of pieces of record presetting information $RR_1, RR_2, \ldots$ is made up of a name of a television program preset to be recorded, a starting date and time for recording of the television program, an ending date and time for the recording, a transfer flag, and an ID of a destination to which transfer is made. The transfer flag represents a flag which is set to "1" when a television program is transferred to the PDA 2. The ID of a destination to which transfer is made represents the user ID assigned corresponding to an account name entered by the PDA 2 operated when a record presetting procedure is made by the user. The conversion presetting information list, as shown in FIG. 3, includes a plurality of pieces of conversion presetting information $TR_1, TR_2, \ldots$, being stored in order of a date and time of presetting for conversion. Each of the plurality of pieces of the conversion presetting information $TR_1, TR_2, \ldots$ is made up of a name of a television program preset to be recorded, the above-described ID of a destination to which transfer is made, and a head address in the storage device 19 in which an image file to be converted is stored. The transfer presetting information list, as shown in FIG. 4, includes a plurality of pieces of transfer presetting information $FR_1, FR_2, \ldots$, being stored in order of a date and time of presetting for transfer. Each of the plurality of pieces of transfer presetting information $FR_1, FR_2, \ldots$ is made up of a name of a television program preset to be recorded, the above-described ID of a destination to which transfer is made, and a head address in the storage device 19 in which a converted image file to be transferred is stored.

Next, operations of the contents using system having the configurations described above are explained by referring to flowcharts shown in FIG. 5 to FIG. 8. First, record presetting processes are explained by referring to the flowchart shown in FIG. 5. When the user, after having supplied power to the server 1 and inserted the PDA 2 into the cradle 3, manipulates a operating section (not shown) in the PDA 2 to instruct a record presetting program to be run, a record presetting program is read from a storage section (not shown) in the PDA 2 and is then executed. This causes a controlling section (not shown) in the PDA 2 to make its routine proceed to Step SA1 shown in FIG. 5 and the controlling section in the PDA 2 judges whether or not a recording date and time of a television program desired to be recorded are entered by the user. If a NO answer is obtained as a result from the judgement, the judging process is repeated by the controlling section in the PDA 2. Then, when the user manipulates the operating section in the PDA 2 to enter a date and time of the recording, the result from the judgement in Step SA1 becomes "YES" and the controlling section in the PDA 2 lets its routine proceed to Step SA2.

In Step SA2, the controlling section in the PDA 2, by carrying out data communications with the server 1 through the cradle 3, judges whether or not the recording date and time confirmed to have been entered by the processing in Step SA1 coincide with any one of the record starting dates and times listed in the plurality of pieces of the record presetting information $RR_1, RR_2, \ldots$ making up the record presetting information list (see FIG. 2) being stored in the storage section 19 in the server 1. If a YES answer is obtained as a result from the judgement in Step SA2, the controlling section in the PDA 2 lets its routine proceed to Step SA3 shown in FIG. 5. In Step SA3, the controlling section in the PDA 2 displays an error message on a display unit (not shown) and, after having made a request for changing the recording date and time, makes its routine return back to Step SA1. On the other hand, if a NO answer is obtained as a result from the judgment in Step SA2, that is, if the recording date and time of which the entry has been confirmed originally or again by the processing in Step SA1 do not coincide with any one of the record starting dates and times listed in the plurality of pieces of the record presetting information $RR_1, RR_2, \ldots$ making up the record presetting information list (see FIG. 2) being stored in the storage section 19 in the server 1, the controlling section in the PDA 2 makes its routine proceed to Step SA4 shown in FIG. 5.

In Step SA4, the controlling section in the PDA 2 judges whether or not a request for transferring has been entered by the user, that is, transfer of an image file of a television program preset to be recorded to the PDA 2 has been requested. If a YES answer is obtained as a result from the judgement, the controlling section in the PDA 2 makes its routine proceed to Step SA5. On the other hand, if a NO answer is obtained as a result from the judgement in Step SA4, that is, if a request for transferring an image file of a television program to the PDA 2 has not been made and the request for transferring has not been entered by the user in order to reproduce the television program preset to be recorded by the server 1, the controlling section makes its routine proceed to Step SA9 shown in FIG. 5.

In Step SA5, the controlling section in the PDA 2, after having set a transfer flag making up information about record presetting of a television program preset to be recorded to "1", makes its routine proceed to Step SA6. In Step SA6, the controlling section in the PDA 2 judges whether or not an account name has been entered by the user. If a YES answer is obtained as a result from the judgement in Step SA6, the controlling section in the PDA 2 makes its routine proceed to Step SA7. In Step SA7, the controlling section in the PDA 2, after having set a user ID corresponding to an account name entered by the user as an ID of a destination to which transfer is made that makes up information about record presetting of a television program preset to be recorded and having stored the above account name into a predetermined area in the storage section in the PDA 2, makes its routine proceed to Step SA9. On the other hand, if a NO answer is obtained as a result from the judgement in Step SA6, that is, if an account name has not been entered by the user, the controlling section in the PDA 2 makes its routine proceed to Step SA8. In Step SA8, the controlling section in the PDA 2, after having set "0" which indicates that the user has not designated a destination to which transfer is made as an ID of a destination to which transfer is made that makes up information about record presetting of a television program preset to be recorded, makes its routine proceed to Step SA9. In Step SA9, the controlling section in the PDA 2, after having transferred the information about the record presetting of a television program preset to be recorded that has been created by processes in Step SA7 or Step SA8, by carrying out data communications with the server 1 through the cradle 3 to the server 1, terminates a series of the processes. As a result, the controlling section 11 in the server 1, after having registered the record presetting information transferred from the PDA 2 in order of a date and time of presetting for recording on the record presetting information list stored in the storage section 19, makes its routine proceed to Step SA10. In Step SA10, the controlling section 11 in the server 1, after having set a timer so that the record processing program runs at a starting date and time making up the record presetting information being stored in the record presetting information list, terminates a series of the processes.

Figure 6:
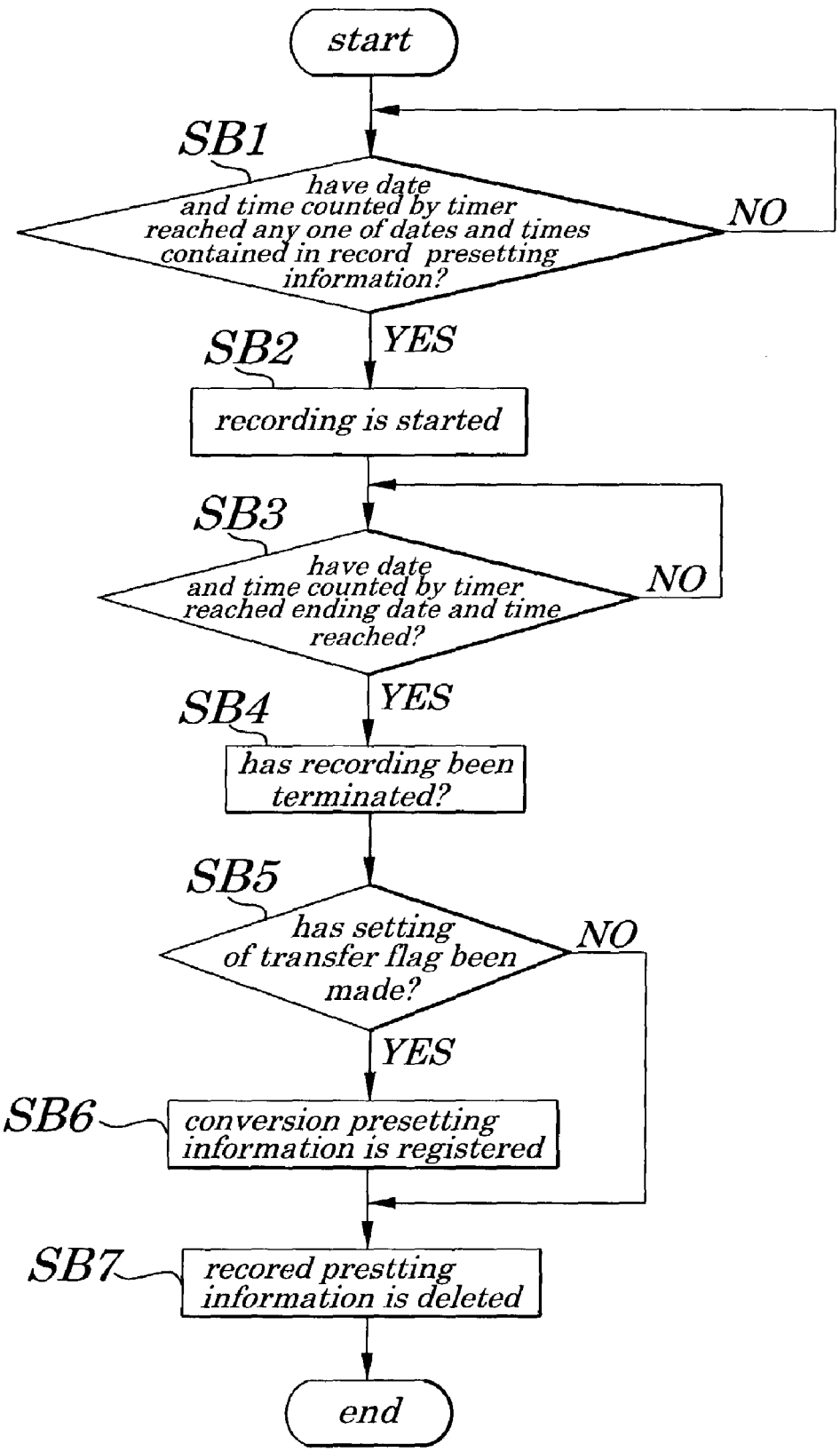
FIG. 6 is a flowchart explaining recording processes employed in the first embodiment of the present invention.

Next, processing of the recording is described by referring to the flowchart shown in FIG. 6. In a state where power has been supplied to the server 1, when the date and time counted by a timer (not shown) reach any one of the starting dates and times contained in the plurality of pieces of record presetting information $RR_1$, $RR_2$, . . . making up the record presetting information list shown in FIG. 2 (Step SB1), recording of a television program whose starting date and time are set in the record presetting information in the recording section 18 is started (Step SB2). In the embodiment, it is assumed that a television program is stored in a predetermined storage area in the storage section 19 in a data format of the MPEG-2. Then, when the date and time counted by the timer (not shown) reach an ending date and time set in the record presetting information (Step SB3), the recording section 18 terminates recording of the television program and informs the controlling section 11 in the server 1 of the termination (Step SB4). This causes the controlling section 11 to judge whether or not a transfer flag set in the above record presetting information has been set to "1" (Step SB5). If a YES answer is obtained as a result from the judgement, the controlling section 11 makes its routine proceed to Step SB6. In Step SB6, the controlling section 11, after having created conversion presetting information using a program name set in the above record presetting information and an ID of a destination to which transfer is made and a head address in the storage section 19 in which an image file to be converted is stored and after having registered the conversion presetting information on the conversion presetting information list shown in FIG. 3, makes its routine proceed to Step SB7. On the other hand, if a NO answer is obtained as a result from the judgement, that is, if the transfer flag set in the record presetting information has not been set to "1", the controlling section 11 makes its routine proceed to Step SB7. In Step SB7, the controlling section 11, after having deleted the above record presetting information from the record presetting information list shown in FIG. 2, terminates a series of the processes.

Figure 7:
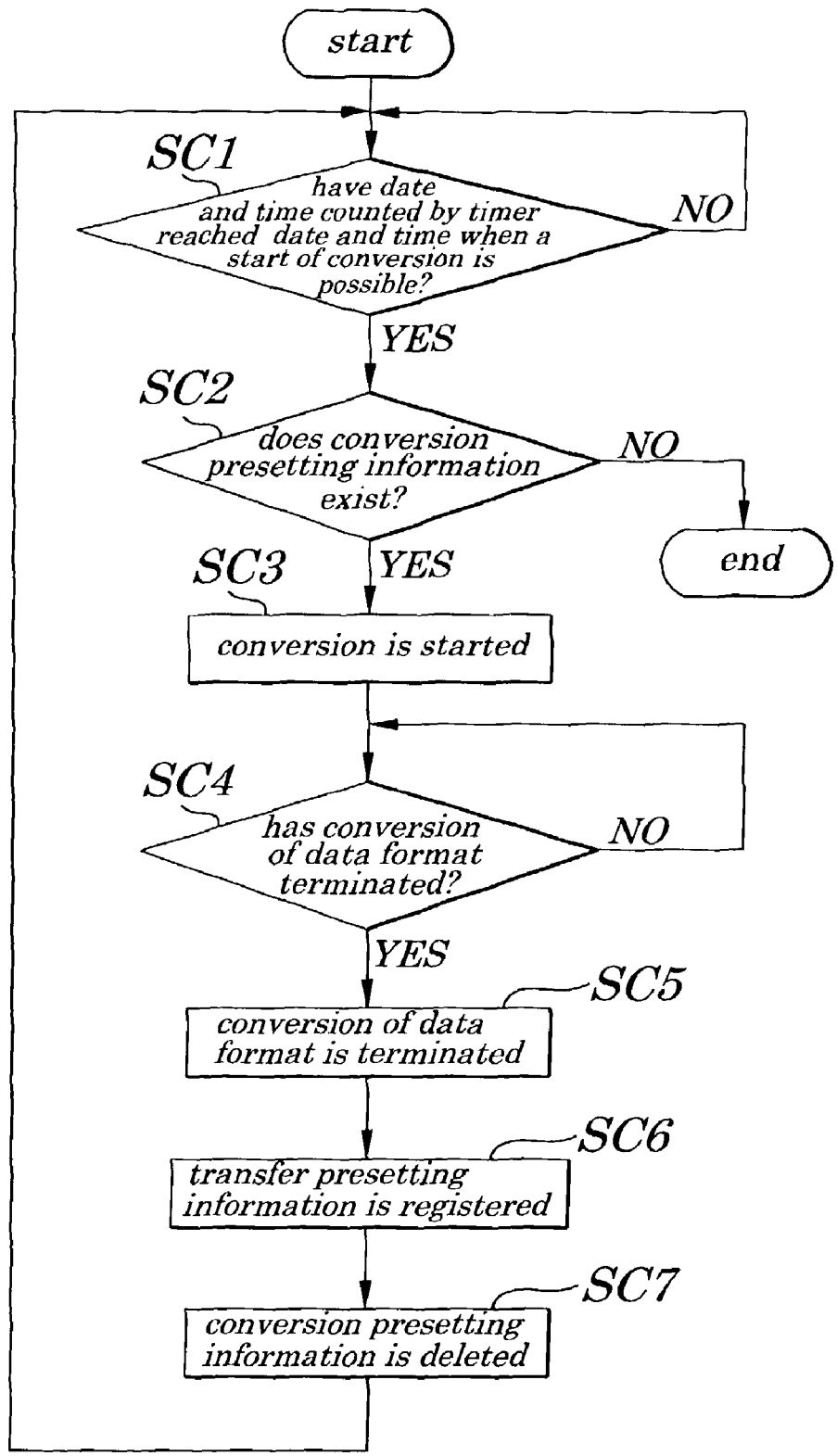
FIG. 7 is a flowchart explaining conversion processes employed in the first embodiment of the present invention.

Next, processing of the conversion is described by referring to the flowchart shown in FIG. 7. As a precondition, the controlling section 11 in the server 1 has, in advance, acquired specifications of the PDA 2 in order to make qualities (data size, resolution, display size of a display section in the PDA 2) of an image file to be transferred to the PDA 2 match with specifications of the PDA 2. The specifications of the PDA 2 need to be acquired by being input by the user in advance when the operating section 12 is manipulated or through a test carried out by the controlling section 11 by transferring, when the PDA 2 has been first inserted into the cradle 3, a sample of the image file through the cradle 3 to the PDA 2 to make it displayed.

First, in a state in which power is supplied to the server 1, when the date and time counted by a timer (not shown) reach a conversion start enabling date and time, that is, the date and time when a start of conversion is possible (Step SC1), a data format conversion program is started and the controlling section 11 makes its routine proceed to Step SC2. The conversion start enabling date and time represent a conversion enabling time band existing after the date and time when recording processing has completed, that is, a most early date and time when continuous time expected to be required for the processing of conversion can be secured. Moreover, the conversion enabling time band represents a time band that is set by the user and the time band during which the server 1 is not used by the user such as sleeping time or leave-time of the user (for example, 1:00 a.m. to 7:00 a.m. and/or 8:00 a.m. to 8:00 p.m.) is set as the conversion enabling time band. In Step SC2, the controlling section 11 judges whether or not conversion presetting information exists in the conversion presetting information list shown in FIG. 3. If a NO answer is obtained as a result from the judgement, the controlling section 11, since no image file to be converted exists, performs nothing and terminates the processing. On the other hand, if a YES answer is obtained as a result from the judgement, that is, if the conversion presetting information exists in the conversion presetting information list shown in FIG. 3, the controlling section 11 makes its routine proceed to Step SC3. In Step SC3, the controlling section 11 controls and instructs the format converting section 17 to start conversion of a data format of an image file of a television program being set in the above conversion presetting information and being stored in the storage section 19 into a data format that enables reproduction in the PDA 2. As a result, the format converting section 17 reads, by referring to a head address making up the conversion presetting information, an image file to be converted from a corresponding head address in the storage section 19 to start the conversion of the data format of the above image file and sequentially stores the image files obtained by the conversion into a predetermined storage area in the storage section 19. In the embodiment, it is assumed that the format converting section 17 converts the image file from its MPEG-2 data format to its MPEG-4 data format.

The format converting section 17 monitors termination of the conversion of the data format and, when the conversion of the data format has terminated (Step SC4), informs the controlling section 11 of the termination (Step SC5). As a result, the controlling section 11 makes its routine proceed to Step SC6 and, after having produced transfer presetting information using a name of the program and an ID of a destination to which transfer is made being set in the record presetting information and a head address in the storing section 19 in which an image file to be transferred to the PDA 2 is stored, registers the transfer presetting information on the transfer presetting information list shown in FIG. 4 and makes its routine proceed to Step SC7. In Step SC7, the controlling section 11, after having deleted the conversion presetting information from the conversion presetting information list shown in FIG. 3, makes its routine return to Step SC1 and repeats the processes in Step SC1 to SC7. Moreover, the controlling section 11, even when the conversion presetting information exists in the conversion presetting information list, if the conversion enabling time band has elapsed, terminates a series of the processes (Step SC1). Also, the controlling section 11, even during the conversion enabling time band, if the conversion presetting information has come not to exist in the conversion presetting information list, terminates a series of the processes (Step SC2).

Figure 8:
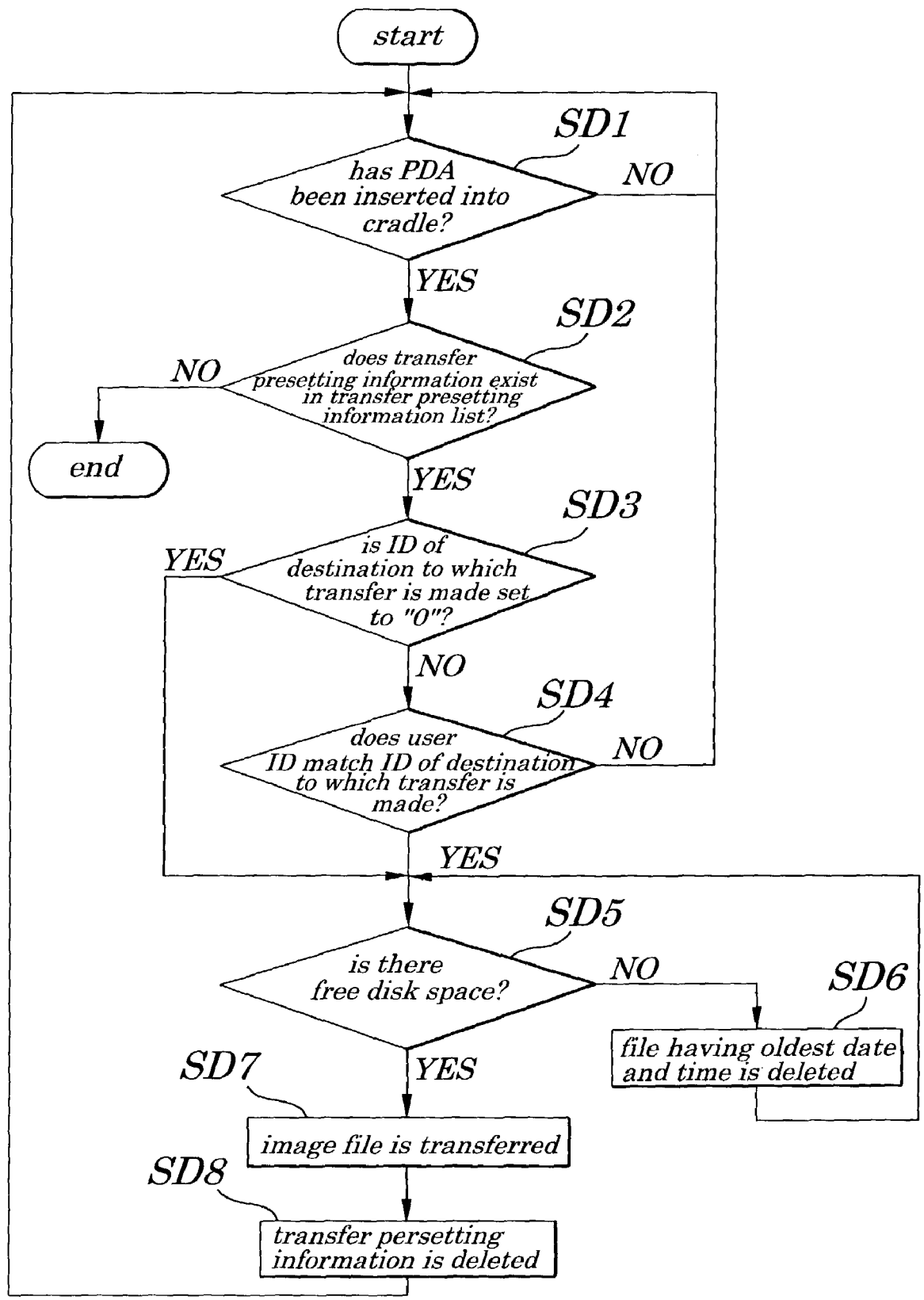
FIG. 8 is a flowchart explaining transfer processes employed in the first embodiment of the present invention.

Next, processing of the transfer is described by referring to the flowchart shown in FIG. 8. First, the task schedule managing section 15, after having terminated the processing of the conversion, controls and instructs the event monitoring section 14 to check, at specified intervals (for example, at intervals of one minute), whether or not the PDA 2 has been inserted into the cradle 3 and then makes its routine proceed to Step SD1 and judges whether or not the task schedule managing section 15 is informed by the event monitoring section 14 of the insertion of the PDA 2 into the cradle 3. When the PDA 2 has been inserted into the cradle 3 and the insertion has been informed the task schedule managing section 15 by the event monitoring section 14, a result from the judgement in Step SD1 becomes YES and the task schedule managing section 15 makes its routine proceed to Step SD2.

In Step SD2, the task schedule managing section 15 judges whether or not the transfer presetting information exists in the transfer presetting information list shown in FIG. 4. If a NO answer is obtained as a result from the judgement, the task schedule managing section 15, since no image file to be transferred to the PDA 2 exists, performs nothing and terminates the processing. On the other hand, if a YES answer is obtained as a result from the judgement in Step SD2, that is, if the transfer presetting information exists in the transfer presetting information list shown in FIG. 4, the task schedule managing section 15 makes its routine proceed to Step SD3. In Step SD3, the task schedule managing section 15 judges whether or not an ID of a destination to which transfer is made which makes up the transfer presetting information is set to "0", that is, whether or not the ID of the destination to which transfer is made is set to "Not designated". If a NO answer is obtained as a result from the judgement in Step SD3, since the ID of the destination to which transfer is made is designated, the task schedule managing section 15 makes its routine proceed to Step SD4 shown in FIG. 8.

On the other hand, if a YES answer is obtained as a result from the judgement in Step SD3, that is, if an ID of a destination to which transfer is made which makes up the transfer presetting information is set to "0", the task schedule managing section 15 makes its routine proceed to Step SD5. An example of a case where an ID of a destination to which transfer is made is set to "0" is a case where the user desires a television program preset to be recorded to be reproduced by the server 1.

In Step SD4, the task schedule managing section 15 makes a request asking the PDA 2 to transfer a user ID through the cradle 3 and, after having obtained the user ID, judges whether or not the user ID obtained from the PDA 2 matches an ID of a destination to which transfer is made which makes up the transfer presetting information. If a NO answer is obtained as a result from the judgement, the task schedule managing section 15, in order to repeatedly perform the processes in Step SD1 to SD3 on other transfer presetting information making up the transfer presetting information list, makes its routine return to Step SD1. On the other hand, if a YES answer is obtained as a result from the judgement in Step SD4, that is, if the above user ID matches an ID of a destination to which transfer is made which makes up the transfer presetting information, the task schedule managing section 15 makes its routine proceed to Step SD5.

In Step SD5, the task schedule managing section 15 judges whether or not a storage section (not shown) in the PDA 2 has enough free disk space to store the image file. If a NO answer is obtained as a result from the judgement, the task schedule managing section 15 makes its routine proceed to Step SD6. In Step SD6, the task schedule managing section 15, after having instructed a file having a oldest storing date and time, out of a plurality of files being stored in the storage section (not shown) in the PDA 2, to be deleted, makes its routine return to Step SD5. This causes the controlling section in the PDA 2 to delete the file having an oldest storing date and time, out of the plurality of files being stored in the storage section (not shown) in the PDA 2. In Step SD5, only image files may be deleted or all files being stored in the storage section (not shown) in the PDA 2 may be deleted.

On the other hand, if a YES answer is obtained as a result from the judgement, that is, if there is enough free disk space to store image files in the storage section (not shown) in the PDA 2 from its original stage or if the free disk space has increased because the files having the oldest storing date and time were deleted and, as a result, the free disk space enough to store the image file comes to exist, the task schedule managing section 15 makes its routine to proceed to Step SD7. In Step SD7, the task schedule managing section 15, after having made a request asking the image file transferring section 16 to transfer the image file being stored in the storage section 19, makes its routine proceed to Step SD8. The image file transferring section 16 sequentially reads converted image files to be transferred to the PDA 2, from a head address in the storage section 19 by referring to a head address making up transfer presetting information and transfers the read image files through the cradle 3 to the PDA 2. In Step SD8, the task schedule managing section 15, after having deleted the transfer presetting information from the transfer presetting information list shown in FIG. 4, makes its routine return to Step SD1 and repeats the processes in Step SD1 to Step SD7. Then, the task schedule managing section 15, when the transfer presetting information comes not to exist in the transfer presetting information list, terminates a series of the processes (Step SD2).

Thus, according to the contents using method employed in the first embodiment, since the only a thing that the user has to do is to set record presetting information about a desired television program and the recording, converting, and transferring processes thereafter are automatically achieved by the server 1, neither time nor labor is required. Moreover, according to the contents using method in the first embodiment, if the storage section in the PDA 2 has not enough free disk space to store image files, since the server 1 sequentially deletes files in the order of the oldest one and then transfers image files to the PDA 2, neither time nor labor is required and there is no danger that needed image files are deleted by mistake. Furthermore, according to the contents using method in the first embodiment, since the server 1 starts processing of conversion of image files from a conversion start enabling date and time during which the user does not use the server 1, the user, when using the server 1, can use application programs other than data format conversion programs.

Second Embodiment

Figure 9:
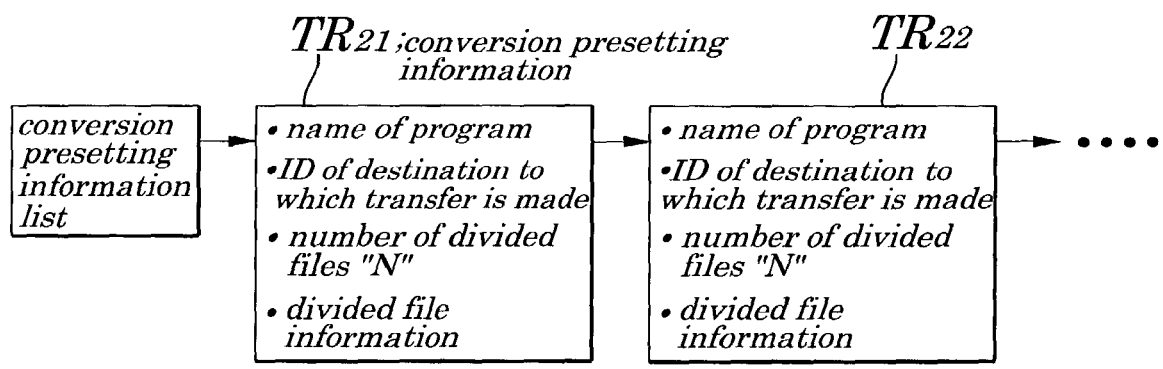
FIG. 9 is a diagram showing one example of a data structure of a conversion presetting information list being stored in a storage section of a server making up a contents using system employed in a second embodiment of the present invention.

A contents using system of a second embodiment has approximately the same configurations as the contents using system employed in the first embodiment shown in FIG. 1. However, processing of conversion and transfer in the second embodiment is different from that in the first embodiment. FIG. 9 is a diagram showing one example of data configurations of a conversion presetting information list being stored in a storage section 19 of a server 1 making up the contents using system employed in the second embodiment of the present invention. The conversion presetting information list, as shown in FIG. 9, is made up of a plurality of pieces of conversion presetting information $TR_{21}$, $TR_{22}$, . . . being stored in order of a date and time of presetting for conversion. Each of the conversion presetting information $TR_{21}$, $TR_{22}$, . . . includes a name of a television program preset to be recorded, an ID of a destination to which transfer is made, a number of divided files, and divided file information. The number of divided files represents a number by which files preset to be recorded is divided. The divided file information represents information included in a divided file information table $TDF_1$ (see FIG. 13) described later and is made up of head time and end time for each of the divided files obtained by dividing an image file and of converted flags. The converted flag represents a flag which is set to "0" before divided files are converted and which is set to "1" after divided files are converted.

Figure 10:
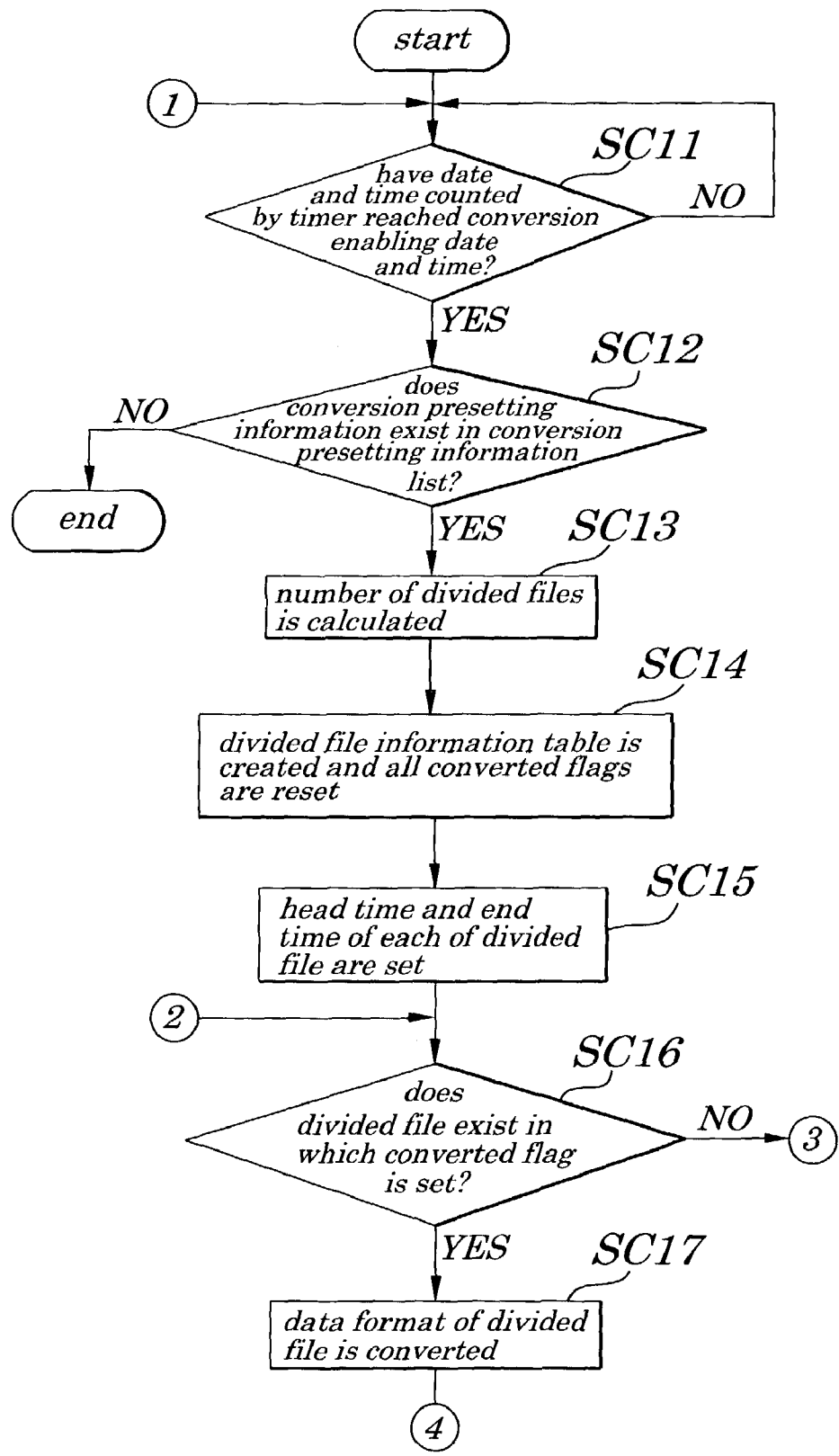
FIG. 10 is a flowchart explaining conversion processes according to the second embodiment of the present invention.
Figure 11:
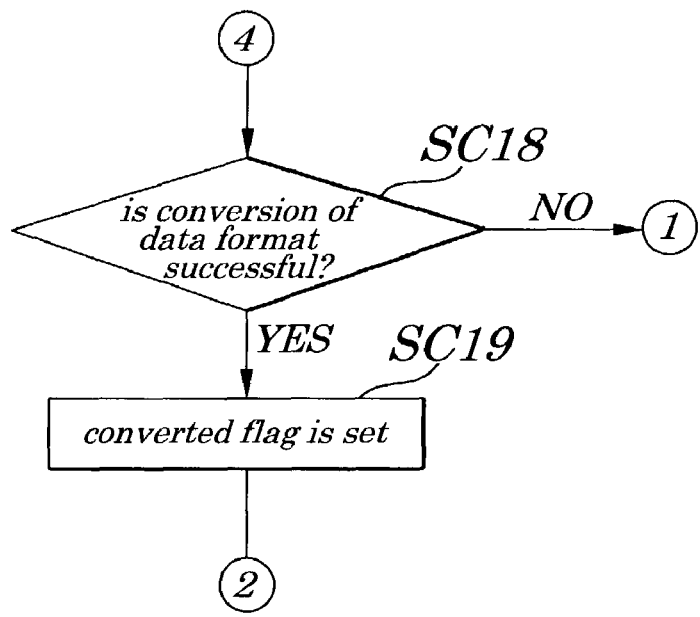
FIG. 11 is also a flowchart explaining the conversion processes according to the second embodiment of the present invention.
Figure 12:
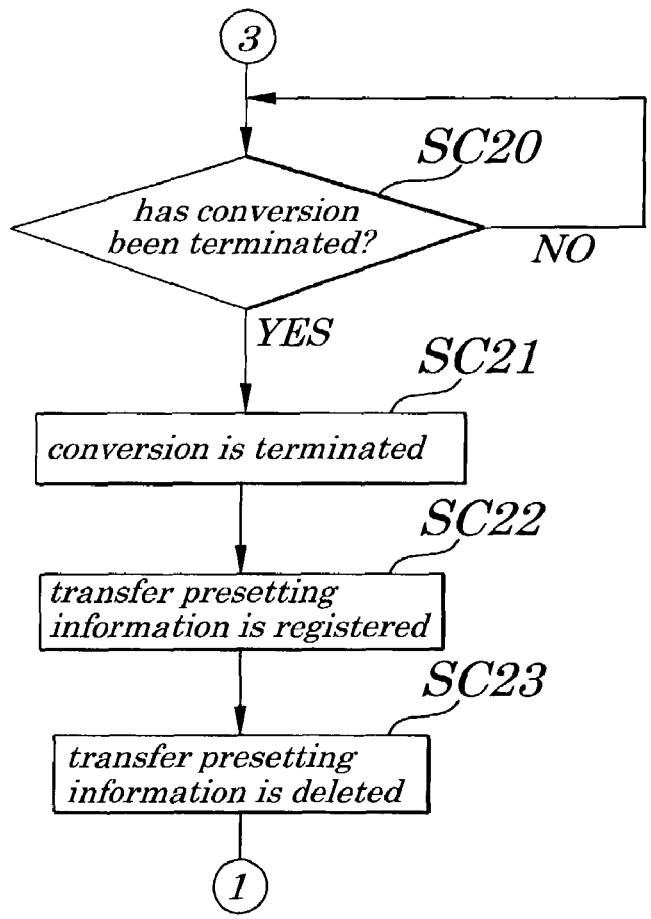
FIG. 12 is also a flowchart explaining the conversion processes according to the second embodiment of the present invention.

Next, processing of the conversion is described by referring to flowcharts shown in FIG. 10 to FIG. 12. As a precondition, a controlling section 11 in the server 1 has, in advance, acquired specifications of a PDA 2 in order to make qualities (data size, resolution, display size of a display section in the PDA 2) of an image file to be transferred to the PDA 2 match with specifications of the PDA 2. The specifications of the PDA 2 need to be acquired by being input by a user in advance when an operating section 12 is manipulated or through a test carried out by the controlling section 11 by transferring, when the PDA 2 has been first inserted into a cradle 3, a sample of the image file through the cradle 3 to the PDA 2 to make it displayed.

Figures 13, 14:
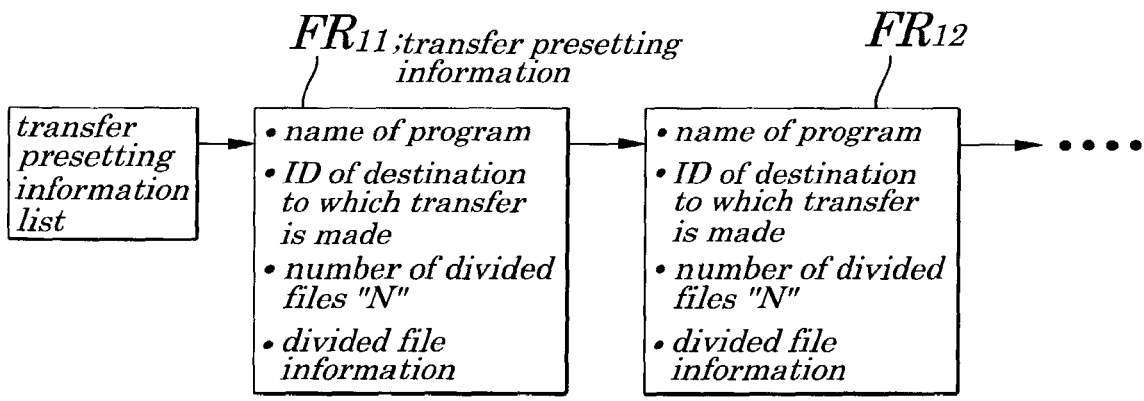
FIG. 13 is a diagram showing an example of configurations of a divided file information table employed in the second embodiment of the present invention.
FIG. 14 is a diagram showing an example of a data structure of a transfer presetting information list employed in the second embodiment of the present invention.

First, in a state where power is supplied to the server 1, when a date and time counted by a timer (not shown) reach a conversion enabling date and time (Step SC11), a data format conversion program is started and the control section 11 makes its routine proceed to Step SC12. In Step SC12, the controlling section 11 judges whether or not conversion presetting information exists in the conversion presetting information list shown in FIG. 9. If a NO answer is obtained as a result from the judgement, the controlling section 11, since no image file to be converted exists, performs nothing and terminates the processing. On the other hand, if a YES answer is obtained as a result from the judgement, that is, if conversion presetting information exists in the conversion presetting information list shown in FIG. 9, the controlling section 11 makes its routine proceed to Step SC13. In Step SC13, the controlling section 11 calculates a number of divided files "N" by dividing a time length of a television program being an object of the conversion by a time length per one of the divided files and stores the resulting number in the conversion presetting information $TR_{21}$, and makes its routine proceed to Step SC14. The above time length may be set in advance at a time of shipment of the server 1 from a factory or may be set in advance by the user and is, for example, ten minutes. In Step SC14, the controlling section 11, based on the number of the divided files N, after having created the divided file information table $TDF_1$ shown in FIG. 13 and having reset all converted flags to "0", makes its routine proceed to Step SC15. As shown in FIG. 13, an image file employed in the embodiment is made of 10 pieces of divided files $DFN_1$ to $DFN_{10}$ and divided files $DFN_1$ to $DFN_{10}$ are divided in every 10 minutes, and all divided files $DFN_1$ to $DFN_{10}$ have not been converted. In Step SC15, the controlling section 11, based on the time length (for example, 10 minutes), after having set a head time and an end time of each of the divided files in the divided file information table $TDF_1$, makes its routine proceed to SC16.

In Step SC16, the controlling section 11, by referring to the divided file information table $DFN_1$ shown in FIG. 13, judges whether or not a divided file exists in which a converted flag is set to "0". If a YES answer is obtained as a result from the judgement, the controlling section 11 makes its routine proceed to Step SC17. In Step SC17, the controlling section 11, after having controlled and instructed a format converting section 17 to convert a data format of a head divided file out of the divided files in which converted flags have been set to "0" to a data format that enables reproduction by the PDA 2, makes its routine proceed to Step SC18 shown in FIG. 11. The format converting section 17, by referring to the divided file information table $TDF_1$ shown in FIG. 13, reads a divided file to be converted from a corresponding address in the storage section 19, converts a data format of the above divided file and stores the converted divided file in a predetermined area in the storage section 19. In the embodiment, it is assumed that the format converting section 17 converts the image file from its MPEG-2 data format to its MPEG-4 data format.

In Step SC18 shown in FIG. 11, the controlling section 11 judges whether or not the conversion of the data format of the divided file was successful. If a YES answer is obtained as a result from the judgement, the controlling section 11 makes its routine proceed to Step SC19. In Step SC19, the controlling section 11, after having set a converted flag corresponding to the above divided file contained in the divided file information table $TDF_1$ to "1", makes its routine return to Step SC16 and performs repeated processes in Step SC16 to SC19 on a subsequent file being stored in the divided file information table $TDF_1$. On the other hand, if a NO answer is obtained as a result from the judgement, that is, if the conversion of the data format of the above divided file was not successful, the controlling section 11, judges that operations are put into a processing disabled state, and makes its routine return to Step SC11 shown in FIG. 10 in order to restart the conversion of the data format of the divided file at a next conversion start enabling date and time.

Moreover, if a NO answer is obtained as a result from the judgement in Step SC16, that is, if there exists no divided file in which the converted flag has not been set to "0" in the divided file information table $TDF_1$ shown in FIG. 13, the controlling section 11 is put in a standby state. The format converting section 17 monitors termination of the conversion of a data format and, when the conversion of the data format terminates (Step SC20 in FIG. 12), informs the controlling section 11 of the termination (Step SC21 in FIG. 12). The controlling section 11 makes its routine proceed to Step SC22 and, after having created transfer presetting information using a name of a program being set in the record presetting information shown in FIG. 2, an ID of a destination to which transfer is made, a number of the divided files N, and the divided file information, registers the information on a transfer presetting information list shown in FIG. 14, makes its routine proceed to Step SC23. In Step SC23, the controlling section 11, after having deleted the conversion presetting information from the conversion presetting information list shown in FIG. 9, makes its routine return to Step SC11 and repeats the processes in Step SC11 to SC23. Moreover, the controlling section 11, even if the conversion presetting information exists in the conversion presetting information list, if a conversion enabling time band has elapsed, terminates a series of the processes (Step SC11). Furthermore, the controlling section 11, even during the conversion enabling time band, if the conversion presetting information comes not to exist in the conversion presetting information list, terminates a series of the processes (Step SC12).

Figure 15:
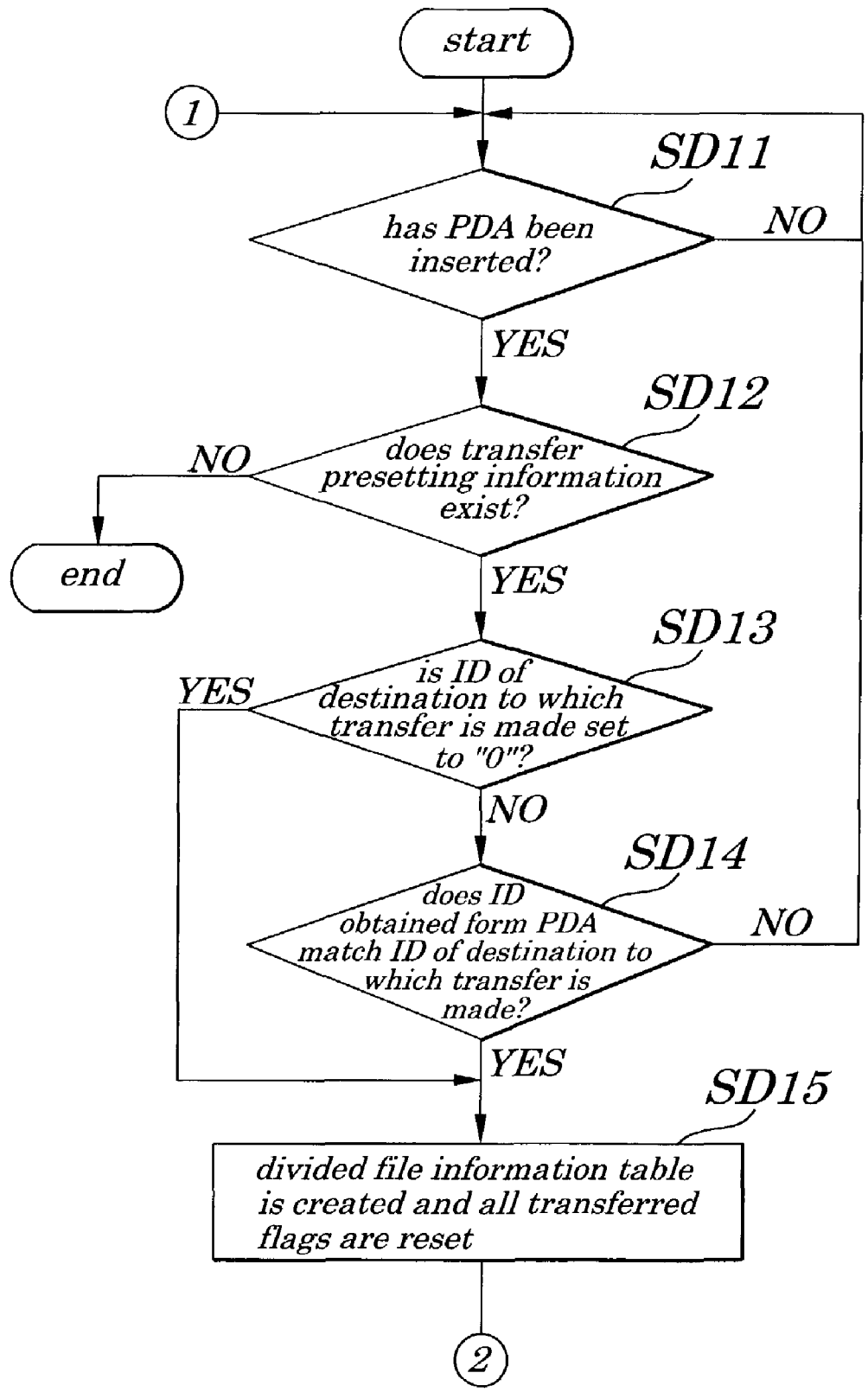
FIG. 15 is a flowchart explaining transfer processes according to the second embodiment of the present invention.
Figure 16:
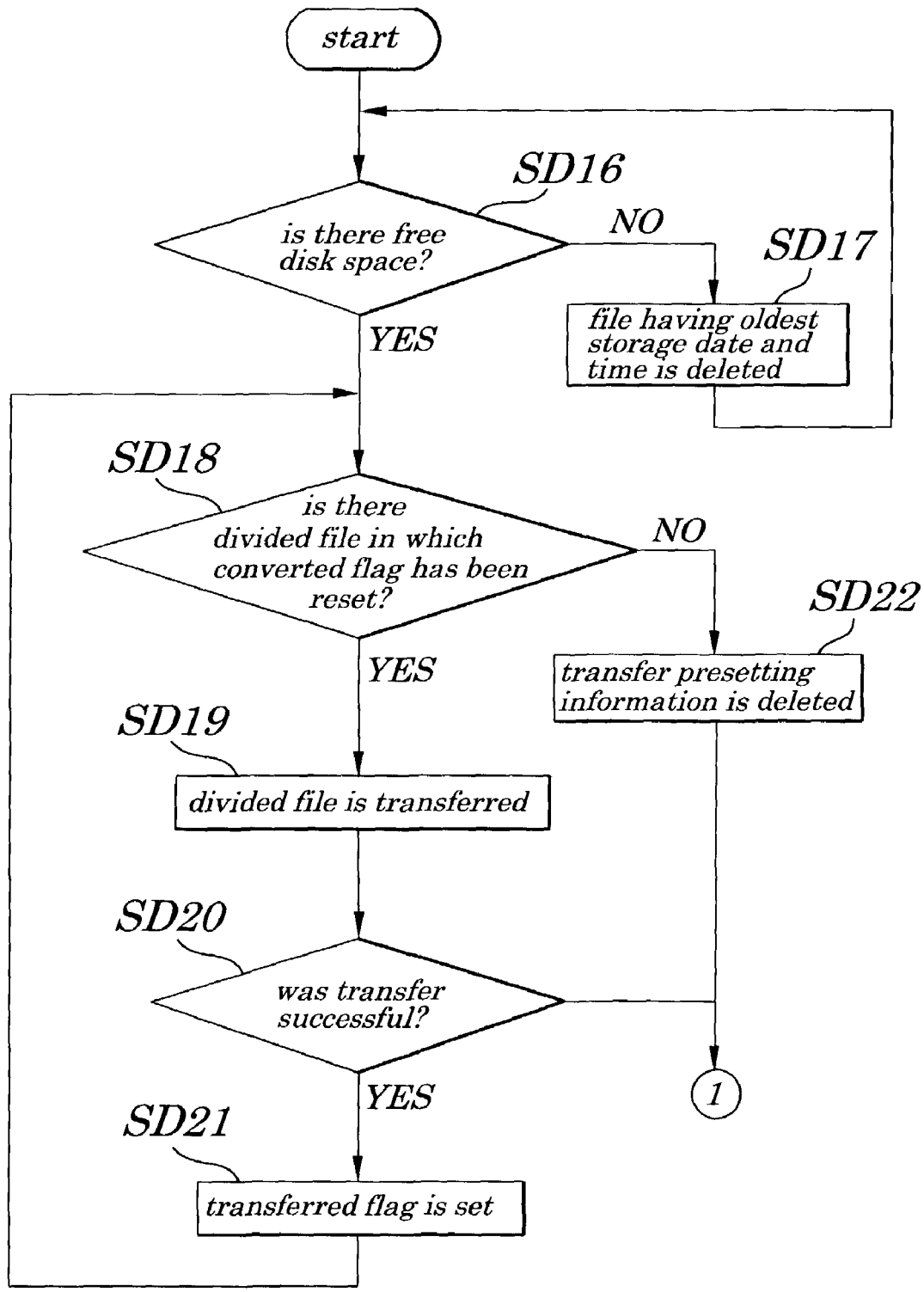
FIG. 16 is a flowchart explaining the transfer processes according to the second embodiment of the present invention.

Next, processing of the transfer is described by referring to the flowcharts shown in FIG. 15 to FIG. 16. First, a task schedule managing section 15, after having controlled and instructed an event monitoring section 14 to check at specified intervals (for example, at intervals of one minute) whether or not the PDA 2 has been inserted into the cradle 3, following the termination of the conversion processing, makes its routine proceed to Step SD11 shown in FIG. 15 and judges whether or not the task schedule managing section 15 is informed by the event monitoring section 14 that the PDA 2 has been inserted into the cradle 3. Then, when the PDA 2 has been inserted into the cradle 3 and when the task schedule managing section 15 is informed by the event monitoring section 14 of the insertion, a result from the judgement in Step SD1 becomes "YES", and the task schedule managing section 15 makes its routine proceed to Step SD12. In Step SD12, the task schedule managing section 15 judges whether or not the transfer presetting information exists in the transfer presetting information list shown in FIG. 14. If a NO answer is obtained as a result from the judgement, the task schedule managing section 15, since no image file to be converted exists, performs nothing and terminates the processing. On the other hand, if a YES answer is obtained as a result from the judgement in Step SD12, that is, if the transfer presetting information exists in the transfer presetting information list shown in FIG. 14, the task schedule managing section 15 makes its routine proceed to Step SD13 shown in FIG. 15. In Step SD13, the task schedule managing section 15 judges whether or not an ID of a destination to which transfer is made which makes up the transfer presetting information is set to "0", that is, whether or not the ID of the destination to which transfer is made is set to "Not designated". If a NO answer is obtained as a result from the judgement in Step SD13, since the ID of the destination to which transfer is made is designated, the task schedule managing section 15 makes its routine proceed to Step SD14 shown in FIG. 15.

On the other hand, if a YES answer is obtained as a result from the judgement in Step SD13, that is, if an ID of a destination to which transfer is made which makes up the transfer presetting information is set to "0", the task schedule managing section 15 makes its routine proceed to Step SD15. An example of a case where an ID of a destination to which transfer is made is set to "0" is a case where the user desires a television program preset to be recorded to be reproduced by the server 1.

In Step SD14, the task schedule managing section 15 makes a request asking the PDA 2 to transfer a user ID through the cradle 3 and, after having obtained the user ID, judges whether or not the user ID obtained from the PDA 2 matches the ID of the destination to which transfer is made which makes up the transfer presetting information. If a NO answer is obtained as a result from the judgement, the task schedule managing section 15, in order to perform repeated processing in Step SD11 to SD13 on other transfer presetting information making up the transfer presetting information list, makes its routine return to Step SD11. On the other hand, if a YES answer is obtained as a result from the judgement in Step SD14, that is, if the above user ID matches the ID of the destination to which transfer is made which makes up the transfer presetting information, the task schedule managing section 15 makes its routine proceed to Step SD15. In Step SD15, the task schedule managing section 15, based on the number of the divided files "N", creates the divided file information table $FDF_1$ shown in FIG. 17 and, after having reset all the transferred flag to "0", makes its routine proceed to Step SD16 shown in FIG. 16. As shown in FIG. 17, the image file of the embodiment is made of 10 pieces of divided files $DFN_1$ to $DFN_{10}$ and all divided files $DFN_1$ to $DFN_{10}$ have not been converted. In Step SD16, the task schedule managing section 15 judges whether or not the storage device (not shown) in the PDA 2 has enough free disk space to store the image file. If a NO answer is obtained as a result from the judgement, the task schedule managing section 15 makes its routine proceed to Step SD17. In Step SD17, the task schedule managing section 15, after having instructed a file having the oldest storing date and time, out of a plurality of files being stored in the storage section (not shown) in the PDA 2, to be deleted, makes its routine return to Step SD16. This causes a controlling section in the PDA 2 to delete the file having the oldest storing date and time, out of the plurality of files being stored in the storage section (not shown) in the PDA 2. In Step SD17, only image files may be deleted or all files being stored in the storage section (not shown) in the PDA 2 may be deleted.

On the other hand, if a YES answer is obtained as a result from the judgement in Step SD16, that is, if there is enough free disk space to store image files in the storage section (not shown) in the PDA 2 from its original stage or if the free disk space has increased because the file having the oldest storage date and time was deleted and, as a result, the free disk space enough to store the image file comes to exist, the task schedule managing section 15 makes its routine to proceed to Step SD18. In Step SD18, the task schedule managing section 15, by referring to the divided file information table $FDF_1$ shown in FIG. 17, judges whether or not there exists a divided file in which the converted flag has been reset to "0". If a YES answer is obtained as a result from the judgement, the task schedule managing section 15 makes its routine proceed to Step SD19.

In Step SD19, the task schedule managing section 15, after having made a request asking the image file transferring section 16 to transfer the divided file being stored in the storage section 19, makes its routine proceed to Step SD20. This causes the image file transferring section 16 to read a divided file to be transferred from a corresponding address in the storage section 19 and to transfer it to the PDA 2 through the cradle 3. In Step SD20, the task schedule managing section 15 judges whether or not the transfer of the divided file was successful. If a YES answer is obtained as a result from the judgement, the task schedule managing section 15 makes its routine proceed to Step SD21. In Step SD21, the task schedule managing section 15, after having set a transferred flag corresponding to the divided file contained in the divided file information table $FDF_1$ to "1", makes its routine return to Step SD18 and perform repeated processing in Step SD18 to SD21 on a subsequent divided file being stored in the divided file information table $FDF_1$. On the other hand, if a NO answer is obtained as a result from the judgement, that is, if the transfer of the divided file was not successful, the task schedule managing section 15 judges that a transfer disabled state occurs in which the PDA 2 has been taken out from the cradle 3 and makes its routine return to Step SD11 shown in FIG. 15 to restart the transfer of the divided file when the PDA 2 is inserted into the cradle 3 next.

Moreover, if a NO answer is obtained as a result from the judgement, that is, if there exists no divided file in which the transferred flag is reset to "0" in the divided file information table $FDF_1$, the task schedule managing section 15 makes its routine proceed to Step SD22. In Step SD22, the task schedule managing section 15, after having deleted the transfer presetting information from the transfer presetting information list shown in FIG. 14, makes its routine return to Step SD11 shown in FIG. 15 and repeats the processes in Step SD11 to SD 21. Then, the task schedule managing section 15, when the transfer presetting information comes not to exist in the transfer presetting information list, terminates a series of the processes (Step SD12).

Thus, according to the contents using method employed in the second embodiment, since processing of conversion and transfer is performed on a plurality of divided files obtained by dividing image files, in addition to effects obtained in the first embodiment, effects as shown below can be achieved. That is, even if the processing of conversion is interrupted during the conversion processing due to user use of the server 1, a divided file on which the processing of the conversion was completed has been already stored in the storage section 19 and the processing of the conversion on remaining divided files left after divided files on which the processing of the conversion was not successful due to the interruption at some midpoint is restarted at a time when a conversion start enabling date and time come again. Therefore, the method of the second embodiment can provide better conversion rate of an image file compared with the case of the first embodiment in which the processing of conversion is performed on entire image files. Similarly, even if the processing of conversion is interrupted because the PDA 2 has been taken away from the cradle 3 during the conversion processing, divided files in which the processing of conversion was completed have been already stored in the storage section (not shown) in the PDA 2 and the processing of conversion on remaining divided files left after divided files on which the processing of conversion was not successful due to the interruption at some midpoint is restarted at a time when the PDA 2 is again inserted into the cradle 3. Therefore, the contents using method of the second embodiment can provide a better conversion rate of an image file and can shorten processing time when compared with the case in the first embodiment in which the processing of conversion is performed on entire image files.

Third Embodiment

Figure 19:
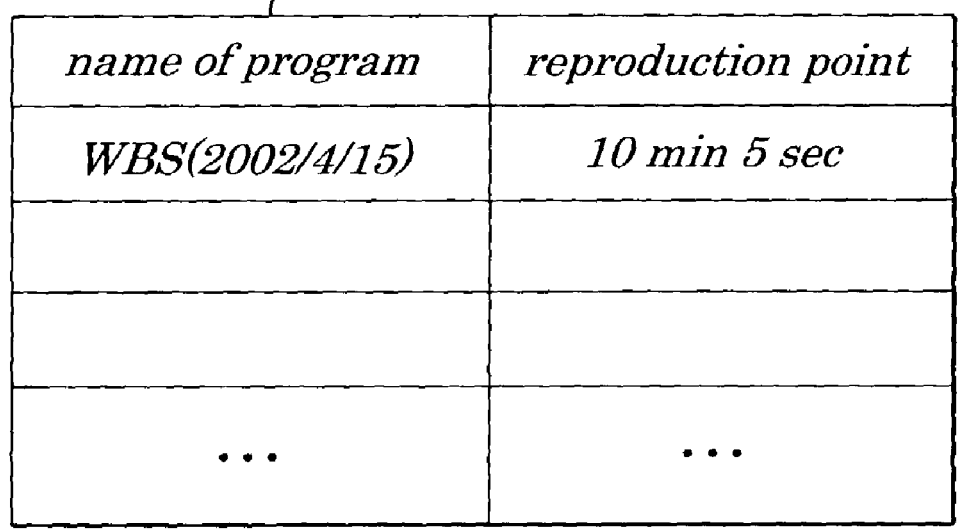
FIG. 19 is a diagram showing an example of configurations of a program managing table being stored in a storage section of a PDA making up the contents using system employed in the third embodiment of the present invention.

A contents using system of a third embodiment has approximately the same configurations as a contents using system employed in the first embodiment shown in FIG. 1. The contents using system of the third embodiment aims at achieving reproduction of same contents by either of a server 1 or a PDA 2 and/or from any point of the contents. For this purpose, in the contents using system of the third embodiment, a reproduction point used to indicate to what point in each image file a user has reproduced and has watched is provided and a program managing table SPM shown in FIG. 18 is stored in a storage section 19 in the server 1 and a program managing table CPM shown in FIG. 19 is stored in a storage section in the PDA 2. If reproduction of an image file by the server 1 or the PDA 2 is discontinued, the reproduction point existing at the time of the discontinuation is transferred to either of them to maintain synchronization. In FIG. 18, the reproduction point "0 minute 0 second" for a television program WBS (2002/4/16) indicates that the program has not been reproduced. Moreover, a method of the third embodiment is formed on premises that an image file for a television program having a same content is stored both in the storage section 19 in the server 1 and in the storage section in the PDA 2.

Figure 20:
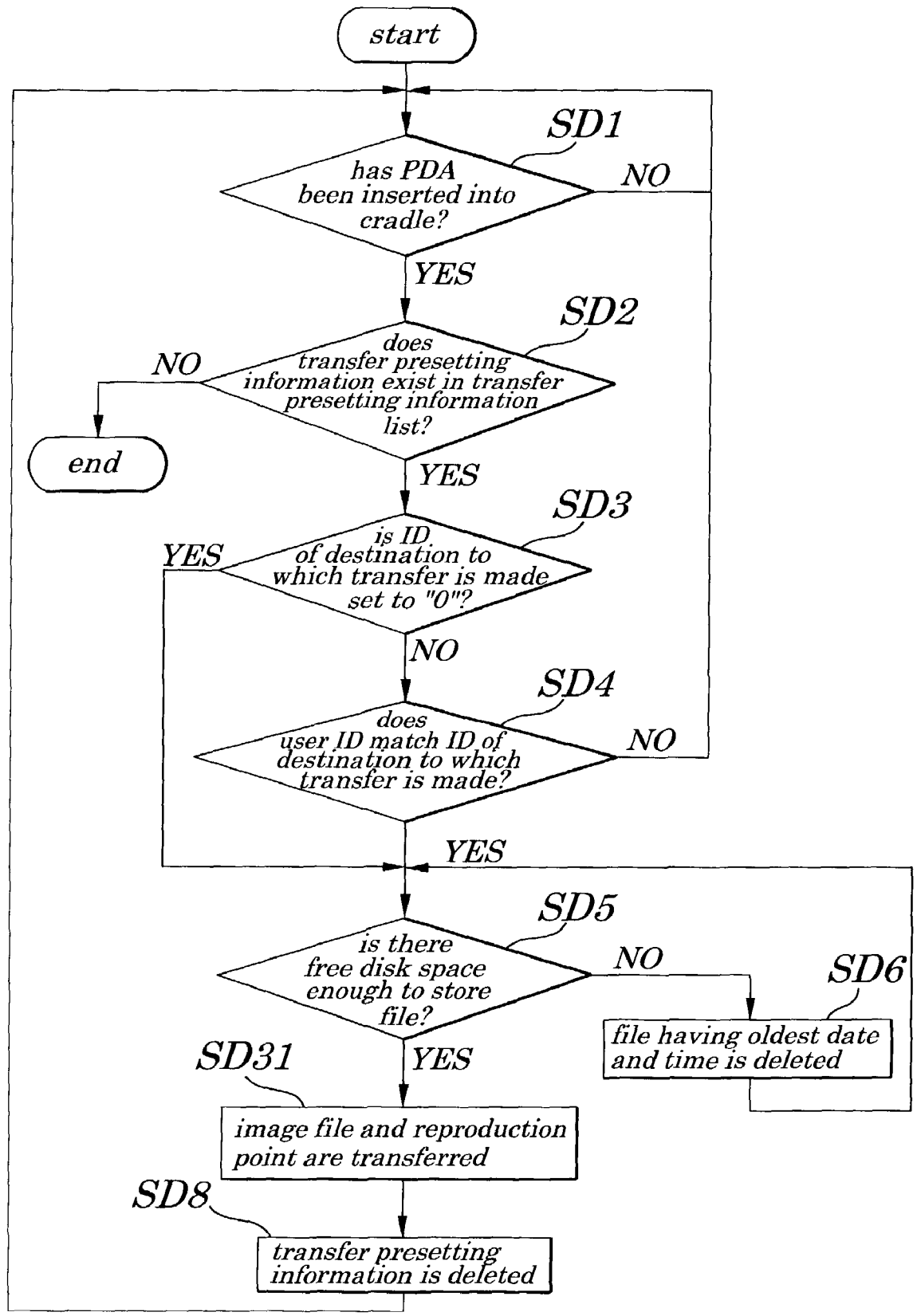
FIG. 20 is a flowchart explaining transfer processes according to the third embodiment of the present invention.

FIG. 20 is a flowchart explaining processing of transfer according to the third embodiment of the present invention. In FIG. 20, a same step name in the flowchart is assigned to a step having a same process as the step shown in FIG. 8. As is apparent from comparison of the flowcharts between in FIG. 20 and in FIG. 8, in the processing of transfer employed in the third embodiment, instead of processing in Step SD7 shown in FIG. 8, processing in Step SD31 in FIG. 20 is provided. In Step SD31, a task schedule managing section 15, after having made a request asking an image file transferring section 16 to transfer the image file being stored in the storage section 19 and, at a same time, having transferred a name of the television program contained in the program managing table SPM being stored in the storage section 19 and shown in FIG. 18 and a reproduction point to the PDA 2 through the cradle 3, makes its routine proceed to Step SD8. This causes the image file transferring section 16, by referring to a head address making up transfer presetting information, to sequentially read converted image files to be transferred, from a corresponding head address in the storage section 19 and to transfer read image files to the PDA 2 through the cradle 3. Therefore, the storage section (not shown) in the PDA 2 stores a name of a program of the transferred image file and a reproduction point in the program managing table CPM shown in FIG. 19.

Figure 21:
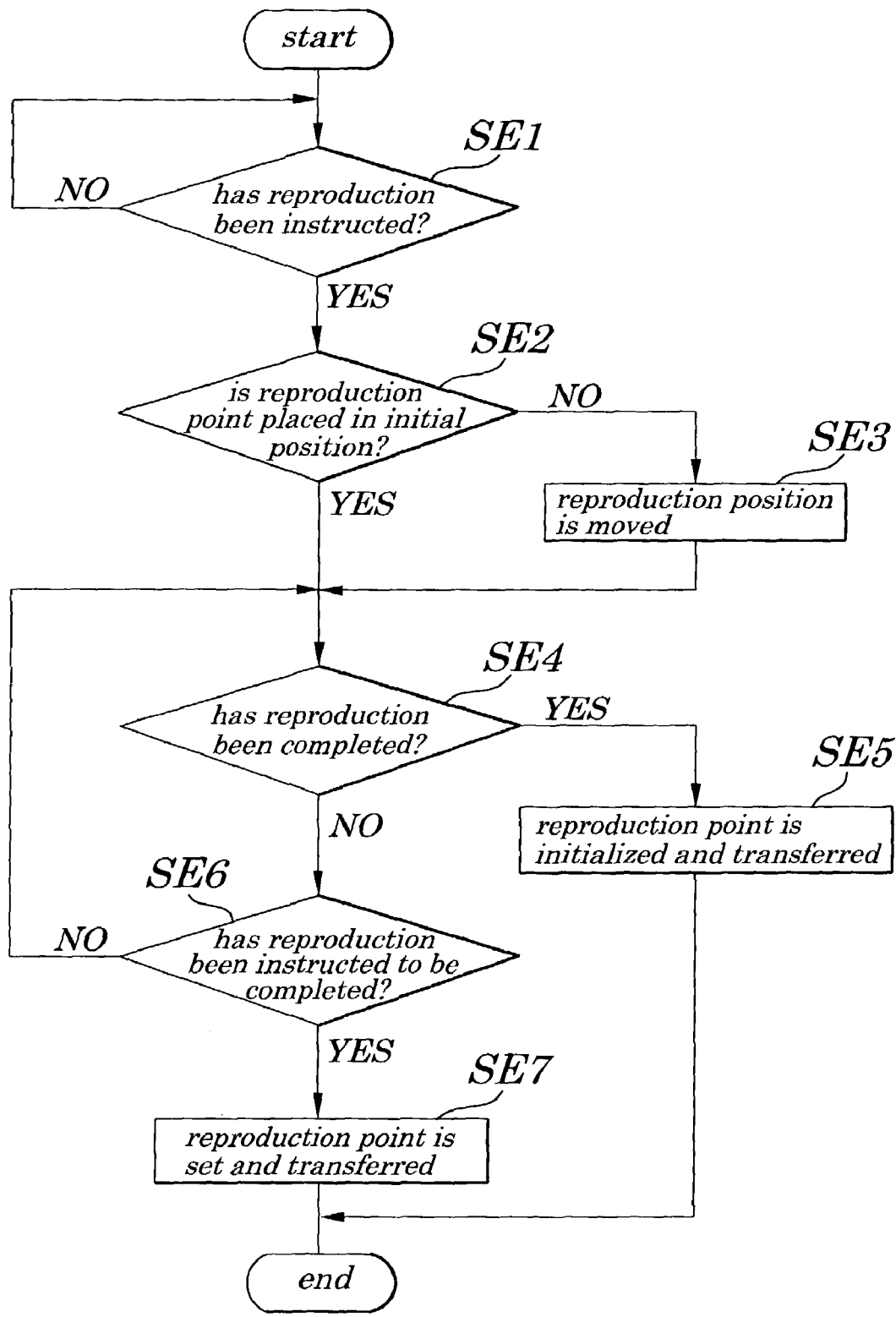
FIG. 21 is a flowchart explaining reproduction processes according to the third embodiment of the present invention.

Next, processing of reproduction is described by referring to the flowchart shown in FIG. 21. Since the reproduction processing can be performed by both a controlling section 11 in the server 1 and a controlling section (not shown) in the PDA 2, only the processing of reproduction performed by the controlling section 11 is here described. When a user, in a state in which power is supplied to the server 1, manipulates and instructs an operating section 12 to start a reproduction program, the reproduction program is read from the storage section 19 and is loaded into the controlling section 11 and the reproduction program is then run. This causes the controlling section 11 to make its routine proceed to Step SE1 shown in FIG. 21 and to judge whether or not an instruction for reproduction of a television program is provided by the user. If a NO answer is obtained as a result from the judgement, the controlling section 11 repeats the judgement. If the user operates and instructs the operating section 12 to provide the instruction for reproduction, a result from the judgement in Step SE1 becomes "YES", and the controlling section 11 makes its routine proceed to Step SE2.

In Step SE2, the controlling section 11, by referring to the program managing table SPM shown in FIG. 18, judges whether or not a value of a reproduction point for the television program is an initial value, that is, "0 minute 0 second". If a NO answer is obtained as a result from the judgement, the controlling section 11 makes its routine proceed to Step SE3. In Step SE3, the controlling section 11, after having moved a reproduction point for an image file of a television program, that is, a head address used to read an image file from the storage section 19, to a reproduction position obtained by referring in the process in Step SE2 and having started reproduction of the image file from the reproduction position, makes its routine proceed to Step SE4. This causes the television program to be reproduced from the above reproduction position and a display section to display an image and a speaker (not shown) to output an amplified voice.

In Step SE4, the controlling section 11 judges whether or not the reproduction of the image file of the television program has been completed. If a YES answer is obtained as a result from the judgement, the controlling section 11 makes its routine proceed to Step SE5. In Step SE5, the controlling section 11 initializes a reproduction point for the television program in the program managing table SPM shown in FIG. 18, that is, sets the reproduction point to "0 minute 0 second" and, at a same time, transfers the reproduction point to the PDA 2 through the cradle 3. This causes the controlling section (not shown) in the PDA 2 to set the reproduction point of the television program in the program managing table CPM shown in FIG. 19 to "0 minute 0 second".

On the other hand, if a NO answer is obtained as a result from the judgement in Step SE4, that is, if the reproduction of the image file of the television program has not been completed, the controlling section 11 makes its routine proceed to Step SE6. In Step SE6, the controlling section 11 judges whether or not the user has controlled and instructed the operating section 12 to complete reproduction of the television program. If a NO answer is obtained as a result of the judgement, the controlling section 11 makes its routine return to Step SE4. On the other hand, if a YES answer is obtained as a result from the judgement in Step SE6, that is, if the user has controlled and instructed the operating section 12 to complete the reproduction of the television program, the controlling section 11 makes its routine proceed to Step SE7. In Step SE7, the controlling section 11 sets a reproduction point of a television program in the program managing table SPM shown in FIG. 18 to a current reproduction position, to "10 minutes 5 seconds" and, at a same time, transfers the reproduction point to the PDA 2 through the cradle 3. This causes the controlling section (not shown) in the PDA 2 to set the reproduction point of the television program in the program managing table CPM shown in FIG. 19 to "10 minute 5 second".

Thus, according to the contents using method of the third embodiment, since a reproduction point of an image file for a same television program is shared between the server 1 and the PDA 2, if the user, after having watched a program whose broadcasting time is comparatively long, for example, a movie, a long time drama, or a live broadcast of sport, to some midpoint, by the server 1 or the PDA 2 and discontinued watching, again starts watching the same program from a point where the user discontinued watching the program, it is made possible for the user to watch the program straight and immediately even after the discontinuation of watching. Moreover, when the user, after having watched a program to some midpoint by the PDA 2, wants to watch, by the server 1, the same program from a point in which the user discontinued watching, or after having watched a program to some midpoint by the sever 1, wants to watch, by the PDA 2, the same program from a point in which the user discontinued watching, the user can immediately watch the program from the point in which the user discontinued watching. Furthermore, the user can manage an image file and related information more simply and exactly when compared with a case where they are managed manually.

Fourth Embodiment

A contents using system of a fourth embodiment has approximately the same configurations as the contents using system employed in the first embodiment shown in FIG. 1. The contents using system of the fourth embodiment aims at achieving such configurations that a user may select a file to be deleted when a storage section (not shown) in a PDA 2 has not enough free disk space to store image files in processing of transfer. For this purpose, in the contents using system of the embodiment, a deleting order table DR shown in FIG. 22 is stored in a storage section 19 in a server 1 and a program managing table $CPM_2$ shown in FIG. 23 is stored in the storage section (not shown) in the PDA 2. In an example of the deleting order table DR shown in FIG. 22, as a genre of a television program, news, sports, drama, and other are provided which are set in order of "high", "middle", "automatic deletion disabled", and "low" of deletion. Moreover, information about the genre to which a program belongs is acquired through a special program guide program used to introduce contents of a television program. The deleting order is set in advance by a user. If the storage section (not shown) in the PDA 2 has not enough free disk space to store the image file in the transfer processing, a file that has been already stored in the storage section (not shown) in the PDA 2 is deleted based on the contents in the deleting order table DR.

Figure 24:
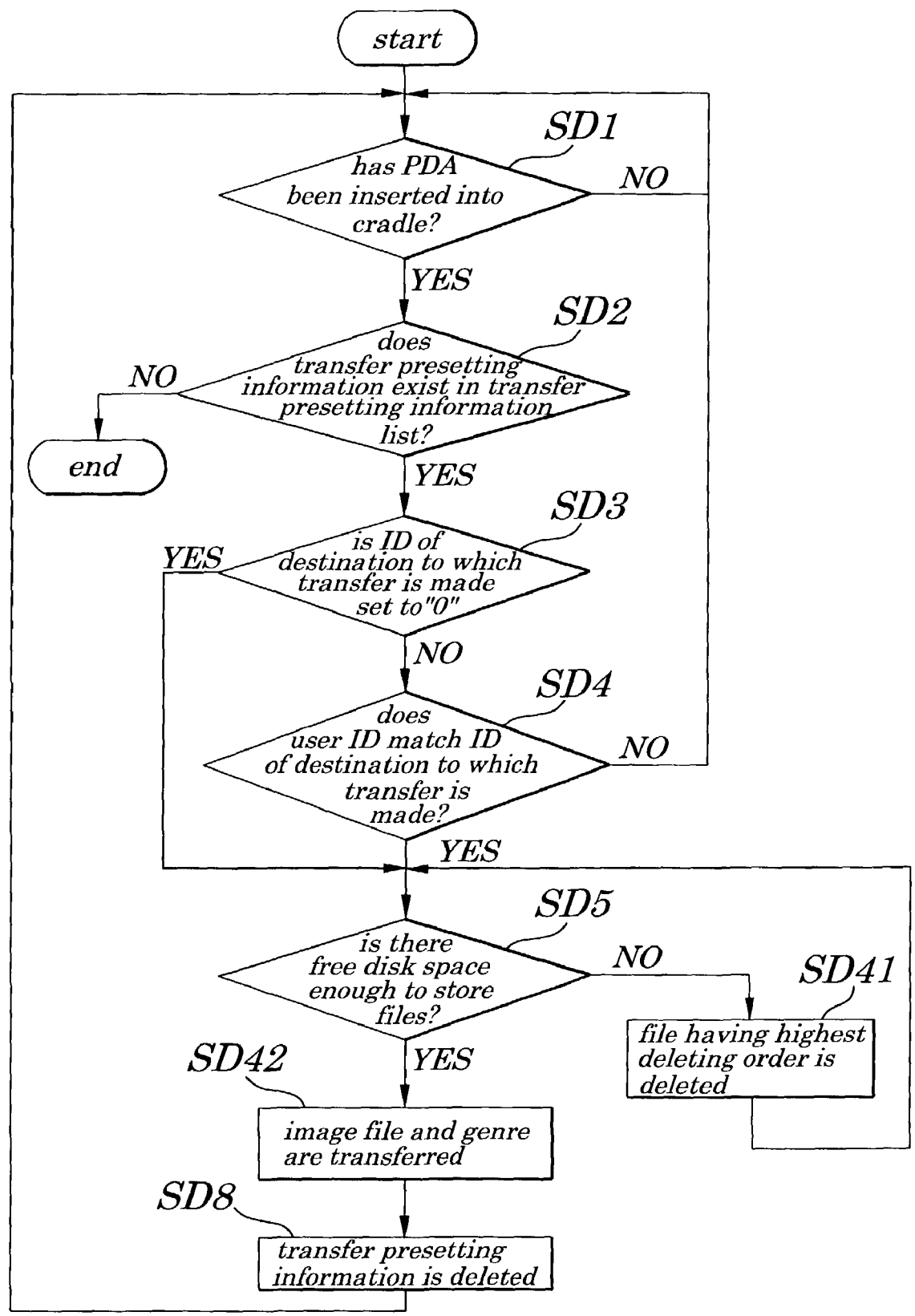
FIG. 24 is a flowchart explaining transfer processes employed in the fourth embodiment of the present invention.

FIG. 24 is a flowchart explaining the processing of transfer employed in the fourth embodiment. In FIG. 24, a same step name in the flowchart is assigned to a step having a same process as a step shown in FIG. 8. As is apparent from comparison of the flowcharts between in FIG. 24 and in FIG. 8, in the processing of transfer employed in the fourth embodiment, instead of processing in Step SD6 and Step SD7 shown in FIG. 8, processing in Step SD41 and Step SD42 in FIG. 24 is provided. In Step SD41, a task schedule managing section 15, after having provided an instruction for deletion of an image file of a television program belonging to a genre having a highest deleting order (news in the example in FIG. 22) by referring to the deleting order table DR shown in FIG. 22, makes its routine return to Step SD5. This causes the controlling section (not shown) in the PDA 2 to delete a file having a highest deleting order out of a plurality of image files being stored in the storage section (not shown) in the PDA 2.

On the other hand, if a YES answer is obtained as a result from the judgement in Step SD5, that is, if there exists enough free disk space to store image files in the storage section (not shown) in the PDA 2 from its original stage or if the free disk space has increased because the file having the highest deleting order was deleted and, as a result, the free disk space enough to store the image file comes to exist, the task schedule managing section 15 makes its routine to proceed to Step SD42. In Step SD42, the task schedule managing section 15, after having a request asking an image file transferring section 16 to transfer the image file being stored in a storage section 19 and having transferred a name and genre of the television program to the PDA 2 through a cradle 3, makes its routine proceed to Step SD8. The image file transferring section 16 sequentially reads converted image files to be transferred, from a head address in the storage section 19 by referring to the head address making up transfer presetting information and transfers the read image files through the cradle 3 to the PDA 2. Therefore, the controlling section (not shown) in the PDA 2 stores a name and genre of a program of the transferred image file in the program managing table $CPM_2$ shown in FIG. 23.

Thus, according to the contents using method employed in the fourth embodiment, since image files are grouped according to an image file and the user sets a deleting order to each genre, there is no danger that needed files or a like are deleted by mistake.

Fifth Embodiment

Figure 25:
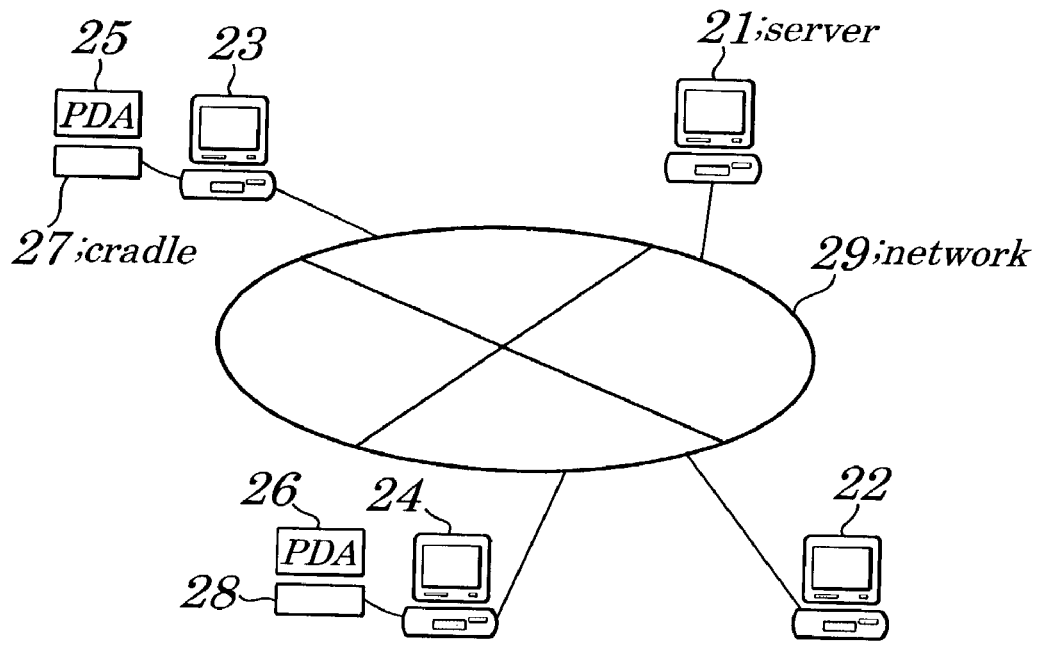
FIG. 25 is a schematic block diagram showing configurations of a contents using system according to a fifth embodiment of the present invention.

FIG. 25 is a schematic block diagram showing configurations of a contents using system according to a fifth embodiment of the present invention. The contents using system of the fifth embodiment, as shown in FIG. 25, includes servers 21 to 24 made up of personal computers, workstations, or a like, PDAs 25 and 26 serving as an example of a portable electronic device, cradles 27 and 28, and a network 29. The network 29 is made up of a LAN (Local Area Network), a WAN (Wide Area Network), or the Internet constructed by combining these networks. Each of the servers 21 to 24 is connected to one another through the network 29. When the PDA 25 and PDA 26 are inserted into the cradle 27 or 28, charging of a battery (not shown) embedded in each of the PDAs 25 and 26 starts and image files and other data are transferred through the cradle 27 or 28 from the server 23 or 24 and the image files and other data are stored in a storage section (not shown) placed internally. Each of these PDAs 25 and 26, as a single unit, has a function of reproducing a image file.

The server 21 has functions, in particular, that a controlling section 11 and an event monitoring section 14 shown in FIG. 1 have, out of functions that a server 1 shown in FIG. 1 has. The server 22 has functions, in particular, that a task schedule managing section 15 and a recording section 18 shown in FIG. 1 have, out of functions that the server 1 shown in FIG. 1 has. The server 23 has functions, in particular, that a image file transferring section 16 has, out of functions that the server 1 shown in FIG. 1 has. The server 24 has functions, in particular, that the image file transferring section 16 and a format converting section 17 shown in FIG. 1 have, out of functions that the server 1 shown in FIG. 1 has. That is, each of the functions that the server 1 shown in FIG. 1 has is possessed by each of the servers 21 to 24 in a distributed manner.

Thus, according to the contents using method of the fifth embodiment, since loads on CPUs making up each of the servers 21 to 24 can be reduced, a user can effectively use the servers 21 to 24. Moreover, it makes it possible for the user to capture any of image files, so long as a file exists in an area where connection to the network 29 can be established, into the PDA 25 or PDA 26.

Sixth Embodiment

Figure 26:
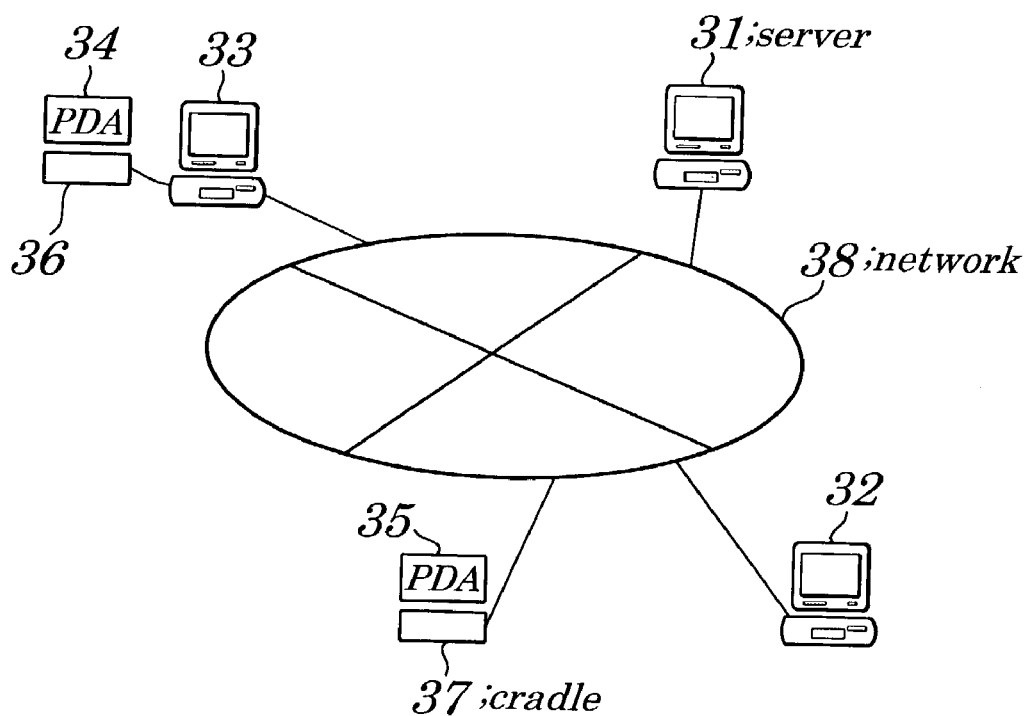
FIG. 26 is a schematic block diagram showing configurations of a contents using system according to a sixth embodiment of the present invention.

FIG. 26 is a schematic block diagram showing configurations of a contents using system according to a sixth embodiment of the present invention. The contents using system of the sixth embodiment, as shown in FIG. 26, includes servers 31 to 33 made up of personal computers, workstations, or a like, PDAs 34 and 35 serving as an example of a portable electronic device, cradles 36 and 37, and a network 38. The network 38 is made up of a LAN (Local Area Network), WAN (Wide Area Network), or the Internet configured by combining them. Each of the servers 31 to 33 and each of the cradles 36 and 37 are connected to one another through the network 38. When each of the PDAs 34 and 35 is inserted into each of the cradles 36 and 37, charging of a battery (not shown) embedded in each of the PDAs 34 and 35 starts and image files and other data are transferred through the cradle 36 or 37 from the server 33 or through the network 38 from any one of the servers 31 to 33 and the image files and other data are stored in a storage section (not shown) placed internally. Each of these PDAs 34 and 35, as a single unit, has a function of reproducing an image file. The server 31 has functions, in particular, that a controlling section 11 and an event monitoring section 14 shown in FIG. 1 have, out of functions that a server 1 shown in FIG. 1 has. The server 32 has functions, in particular, that a task schedule managing section 15, a format converting section 17 and a recording section 18 shown in FIG. 1 have, out of functions that the server 1 shown in FIG. 1 has. The server 33 has functions, in particular, that an image file transferring section 16 has, out of functions that the server 1 shown in FIG. 1 has. That is, in the contents using system of the sixth embodiment, each of the functions that the server 1 shown in FIG. 1 has is possessed by each of the servers 31 to 33 in a distributed manner and the cradle 37 is directly connected to the network 38.

Thus, according to the contents using method of the sixth embodiment, since loads on CPUs making up each of the servers 31 to 33 can be reduced, a user can effectively use the servers 31 to 33. Moreover, even in an area in which only the cradle 37 exists and no server exists, the user can receive an image file.

Seventh Embodiment

Figure 27:
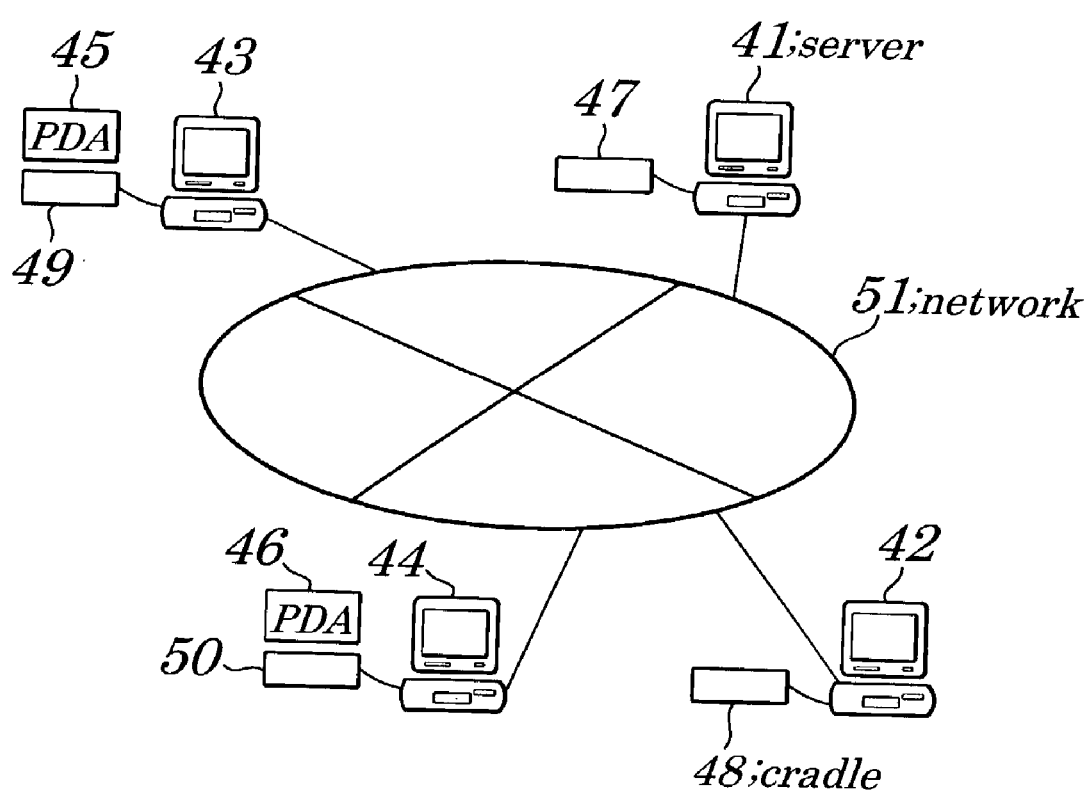
FIG. 27 is a schematic block diagram showing configurations of a contents using system according to a seventh embodiment of the present invention.

FIG. 27 is a schematic block diagram showing configurations of a contents using system according to a seventh embodiment of the present invention. The contents using system of the seventh embodiment, as shown in FIG. 27, includes servers 41 to 44 made up of personal computers, workstations, or a like, PDAs 45 and 46 serving as an example of a portable electronic device, cradles 47 to 50, and a network 51. The network 51 is made up of a LAN (Local Area Network), WAN (Wide Area Network), or the Internet configured by combining them. The servers 41 to 44 are connected to one another through the network 51. When each of the PDAs 45 and 46 is inserted into any one of the cradle 47 to 50, charging of a battery (not shown) embedded in each of the PDAs 45 and 46 starts and image files and other data are transferred through the cradle 47 to 50 from the servers 41 to 44 and image files and other data are stored in a storage section (not shown) placed internally. Each of these PDAs 45 and 46, as a single unit, has a function of reproducing the image file. The servers 41 to 44 have all functions that a server 1 shown in FIG. 1 has.

By configuring as above, only by manipulating any one of the servers 41 to 44, a desired image file can be received by the PDA 45 or PDA 46 and further by carrying out data communications with another server through the network 51, a variety of image files having been already stored in the storage section of the other server can be captured into the PDA 45 or PDA 46. Moreover, in this case, since sufficient efficiency can not be achieved if processing of recording or conversion of image files of television programs each having a same content is performed by a plurality of servers, it is necessary that any one of the servers 41 to 44 manages the recording processing, conversion processing being performed by all the servers 41 to 44, or types or contents of image files being stored in each of storage sections in each of the servers 41 to 44.

Eighth Embodiment

Figure 28:
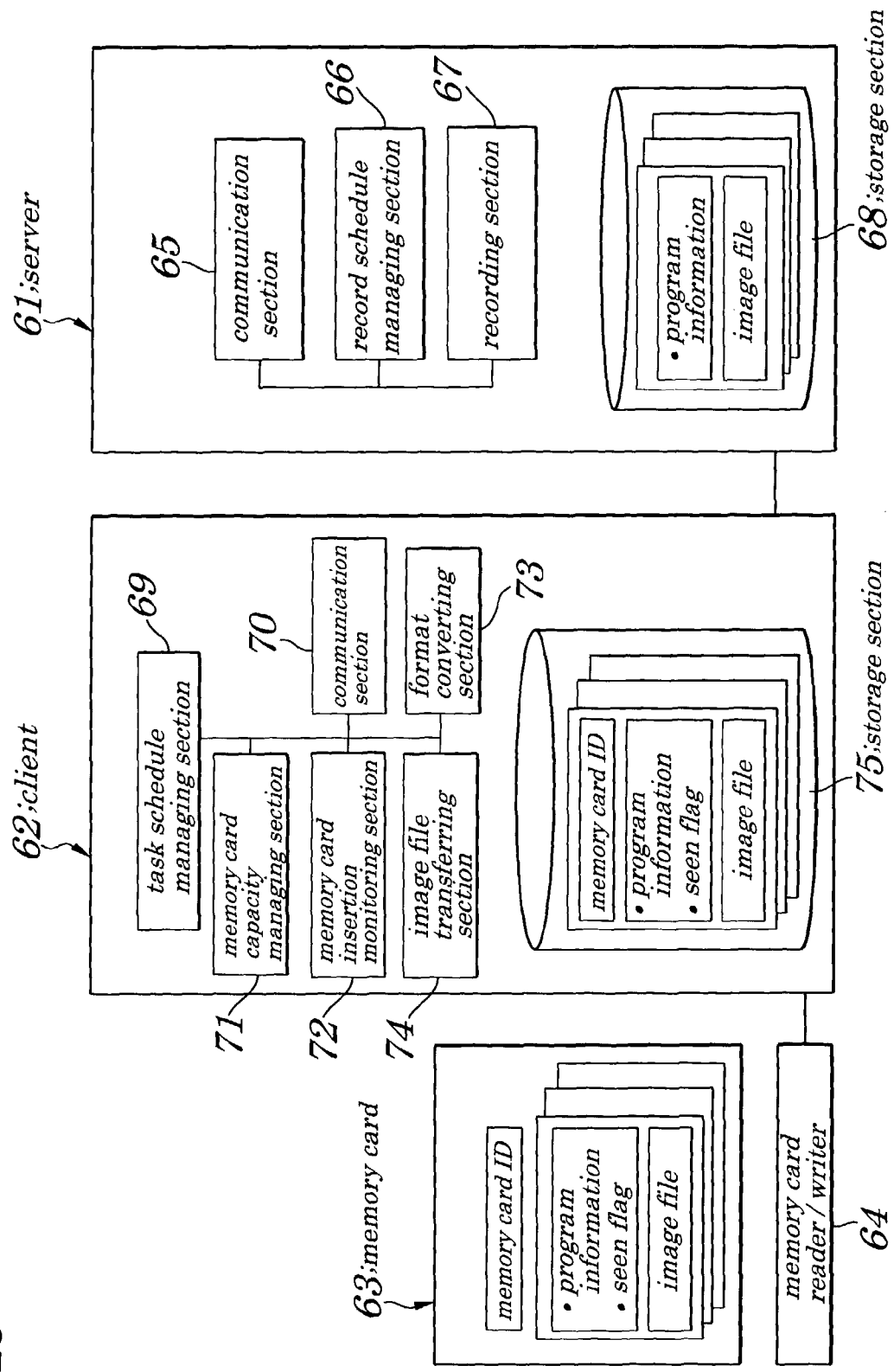
FIG. 28 is a schematic block diagram showing configurations of a contents using system according to an eighth embodiment of the present invention.

FIG. 28 is a schematic block diagram showing configurations of a contents using system according to an eighth embodiment of the present invention. The contents using system of the eighth embodiment includes a server 61 made up of personal computers, workstations, or a like, a client 62 made up of personal computers, workstations, or alike, a memory card 63, and a memory card reader/writer 64. The server 61 is connected to the client 62 through a cable. The client 62 is connected to a memory card reader/writer 64 through a cable.

The server 61 has a communication section 65, a record schedule managing section 66, a recording section 67, and a storage section 68. The communication section 65 transfers or exchanges image files and/or various data by carrying out data communications with the client 62. The record schedule managing section 66 manages schedules so that the recording section 67 records image files according to an instruction for record presetting provided by a user. The recording section 67 has almost the same function as a recording section 18 shown in FIG. 1 has. The storage section 68 is made up of a semiconductor memory such as a ROM, RAM, or a like, an FD driver equipped with an FD, an HD driver equipped with an HD, an MO disk driver equipped with an MO disk, a CD-ROM, a CD-R, a CD-RW, a CD/DVD driver equipped with a DVD-ROM, DVD-R, DVD-RW or a like. The storage section 68 stores image files having high image quality and high voice quality and all information (for example, channels, performers or a like) related to television programs for every image file. All the information related to the television programs is called "meta information" hereinafter.

The client 62 has a task schedule managing section 69, a communication section 70, a memory card capacity managing section 71, a memory card insertion monitoring section 72, a format converting section 73, an image file transferring section 74, and a storage section 75. The task schedule managing section 69 has almost the same function as a task schedule managing section 15 shown in FIG. 1 has. The communication section 70 transfers and exchanges image files and/or various data by carrying out data communications with the server 61. The memory card capacity managing section 71 manages storage capacity of the memory card 63 through the cable and the memory card reader/writer 64. The memory card insertion monitoring section 72 monitors to check whether or not the memory card 63 has been inserted into the memory card reader/writer 64 through the cable. The format converting section 73 has almost the same function as format converting section 17 shown in FIG. 17 has. The image file transferring section 74 has almost the same function as an image file transferring section 16 shown in FIG. 1 has. The storage section 75 is made up of a semiconductor memory such as a ROM, RAM, or a like, an FD driver equipped with an FD, an HD driver equipped with an HD, an MO disk driver equipped with an MO disk, a CD-ROM, a CD-R, a CD-RW, a CD/DVD driver equipped with a DVD-ROM, DVD-R, DVD-RW or a like. The storage section 75 stores an image file having low capacity that has been already converted, a memory card ID used to identify the memory card 63, meta information (FIG. 28 shows Program Information) for every image file, and a seen flag indicating that an image file has been already seen. The memory card 63 stores a memory card ID, meta information for every image file, a seen flag.

Thus, according to the contents using method of the eighth embodiment, since loads on CPUs making up each of the servers 61 or the client 62 can be reduced, the user can effectively use the servers 61 or the client 62. Moreover, it makes it possible for the user to use portable electronic devices such as a PDA or a like which can be inserted into the memory card 63 for other purpose.

It is apparent that the present invention is not limited to the above embodiments but may be changed and modified without departing from the scope and spirit of the invention. For example, in the above first embodiment, the example is shown in which the user manipulates the operating section in a PDA 2 to achieve presetting of recording, however, the present invention is not limited to this, that is, the user may manipulate an operating section 12 in a server 1 to achieve presetting of recording. Also, when the user manipulates the operating section in the PDA 2 to achieve presetting of recording, the server 1 may be so configured that an EPG (Electronic Program Guide) data of a program table used for presetting of recording has been transferred.

Moreover, in the above first embodiment, an example is shown in which an image file is transferred to the PDA 2 from the server 1 through a cradle 3, however the present invention is not limited to this, that is, an image file may be transferred by wireless or through a cable without using the cradle 3.

Also, in the above first embodiment, an example is shown in which a data format of an image file to be transferred to the PDA 2 is always converted to a data format of an MPEG-4, however, the present invention is not limited to this. That is, if the storage section in the PDA 2 has sufficient storage capacity, an image file having high-image quality recorded by the server 1 may be directly transferred to the PDA 2 without the process of conversion. To do this, the contents using system may be so configured that quality of an image file can be designated when the user performs presetting of recording, and information about quality of the image file can be contained in the record presetting information.

Also, in the above first embodiment, an example is shown in which a number of users is only one, however, a plurality of users may be its users. In this case, a plurality of users may preset recording of a television program having a same content and, if quality of an image file as explained above is designated, there can be a case where image files having high image quality and having low image quality are each separately designated by the user. At this point, since it is possible to convert a high-quality image file into a low-quality image file later, the contents using system may be so configured that only high-quality image file recording is designated. By configuring as above, efficient use of a storage section 19 in the server 1 is made possible.

Also, in the above second and third embodiments, an example is shown in which all divided files for an image file not having undergone the conversion and transfer processing being stored in the storage section 19 in the server 1 are left as they are until the conversion or transfer processing on all divided files making up an image file is completed, however, the present invention is not limited to this. That is, divided files not having undergone the conversion and transfer processing which correspond to divided files successfully having undergone the conversion and transfer processing may be deleted from the storage section 19 in the server. By configuring above, efficient use of the storage section 19 is made possible.

Also, in the above first and fourth embodiments, the example is shown in which, if the storage section in the PDA 2 has no free disk space enough to store image files, oldest file or files having higher deleting order are deleted, however, the present invention is not limited to this. For example, the contents using system may be so configured that, by deleting transferred files being stored in the storage section in the PDA 2 after some of the files being stored in the above storage section in the PDA 2 have been transferred to the server 1 through the cradle 3 and stored in the storage section 19 in the server 1, the storage section in the PDA 2 comes to have enough sufficient free disk space to store the image files. Moreover, the contents using system may be also so configured that information (for example, a title name, a recorded date and time, a thumbnail image, or a like) is displayed, before the files are deleted, in the display unit in the PDA 2 or the display section 13 in the server 1 so as to have the user confirm the information and the files are deleted by an instruction for deletion provided by the user. Also, the contents using system may be so configured that, if a same file being stored in the storage section 19 in the server 1 is also stored in the storage section in the PDA 2, a priority is given to deletion of the files being stored in the PDA 2. The contents using system may be also configured so that, by providing a table, for every image file or every divided file being stored in the storage section in the PDA 2, adapted to store a seen flag which is set to "1" when the user has already seen the image file, a priority is given to deletion of image files or divided files whose seen flag has been set to "1". The contents using system may be also configured that, in a state where an image file or divided file having a same content as image files or divided files having been already deleted from the storage section in the PDA 2 still remains stored in the storage section 19 in the server 1, when the user wants to delete an image file or divided file, attention is called, through an icon or an alarm, to the user by being informed that the image file or divided file have been already deleted from the storage section in the PDA 2. By configuring as above, needed files can be preserved surely. Additionally, the image file may be divided into elements such as chapters, image scenes, items or a like so that conversion of image quality or transfer of the file is performed for every element.

Also, in the above embodiments, the example is shown in which an ID of a destination to which transfer is made corresponds to an account name of each user, however, the present invention is not limited to this. That is, the contents using system may be so configured that the ID is assigned to each PDA and when presetting of recording is performed by the PDA, the above ID is also transferred together when record presetting information is transferred to the server or a like and an image file is transferred only to the PDA having the ID of the destination to which transfer is made. By configuring as above, even when a plurality of users uses the cradle 3 and/or memory card reader/writer, or a like, in common or even when one user uses a plurality of the cradles 3 or memory card readers/writers, user inputting of the ID at the time of record presetting is not required.

Also, in the above embodiments, the example is shown in which a conversion enabling time band is preset by the user, however, the present invention is not limited to this. That is, a transferring date and time may be set by the user. In this case, the task schedule managing section 15 calculates time required for transfer and conversion by performing an inverse operation on a transfer completion date and time and sets a conversion starting date and time, and then instructs the format converting section 17 to start conversion processing of an image file from the conversion starting date and time. Moreover, the conversion enabling time band may be automatically set by the server 1 according to a past use state by the server 1. For example, whether or not the operating section 12 is manipulated in unit of, for example, three hours for every day of a week is stored and a time band having a least number of times of operations is set as the conversion enabling time band.

Also, in the above second embodiment, the fact is explained in which the conversion processing is interrupted by a user use of the server 1 during the time of conversion processing, however, a method of detecting the use by the user is not described. The method for the detection may include a method in which the use by the user is detected by an optical sensor or a camera mounted in a main body of the server 1 or in the display section 13, a method in which the use by the user is detected by tracing the use of a key board or a mouse, or a method in which an operation now being performed by the user is shown explicitly. After the interruption, if the use by the user is not detected during a period of time exceeding 10 minutes, the conversion processing is restarted. Moreover, if the user is using the server 1 even after the conversion start enabling date and time is reached, the contents using system may be configured so as not to start the conversion processing. Also, the contents using system may be so configured, as shown in FIG. 27, that, if servers 41 to 44 having the same functions are connected to one another through a plurality of networks 51, the above conversion processing is performed by using servers other than those being now used by the user.

Also, the contents using system may be configured so that the conversion processing is interrupted when a load on the CPU making up the server exceeds a threshold level for a period of time within a predetermined period and is restarted when the load on the CPU becomes less than a threshold level within a predetermined period for other period of time. For example, when the load on the CPU exceeds 70% for 3 seconds or more, the conversion processing is interrupted and then the load on the CPU is less than 10% for a period of time of 3 seconds or more, the conversion processing is restarted. In this case, it is presumed in advance that a load on the CPU occurring due to the conversion processing is 30%. Also, in the above case, the conversion processing of divided files which was under processing of the conversion at the time of interruption may be again performed from its start stage. Configurations employed for the conversion processing described above can be applied to a case of transfer processing.

Also, in the above embodiments, the example is shown in which the present invention is applied to a PDA 2, however, the present invention is not limited to this. That is, the present invention can be applied to a portable electronic device having a display section and a storage section and to which power is supplied by a battery, a dry cell, a solar cell, a fuel cell, or a like, such as a computer including a notebook-type, palm-size-type, pocket-type computer, portable cellular phone, PHS, or a like. In the present invention, a destination to which transfer of an image file is made is not limited to a portable electronic device and an image display device being a stationary-type electronic device and not having a function of receiving television programs, but having a function of displaying an image may be also the destination to which transfer of the file is made. In addition, the present invention can be applied to an optional product such as a PC card or a like in which a program is stored having a function being equivalent to that of a controlling section to perform data exchange with a server, to display contents such as an image file or a like on a display section, or to store data in the storage section in an electronic device having only a display section or an electronic device having both a display section and a storing section.

Also, in the above embodiment, the example is shown in which an image file having recorded television programs is transferred to the PDA, however, the present invention is not limited to this. That is, an image file or music file which has been once stored into a storage section of a server after being read from a DVD, CD, or a like, may be transferred. Moreover, an image file or a music file which had been downloaded through the Internet and then have been once stored by the server may be transferred to the PDA.

Furthermore, in each of the above embodiments, the example is shown in which each of the components is constructed of hardware, however, the present invention is not limited to this. That is, functions of the event monitoring section 14, task schedule managing section 15, image file transferring section 16, format converting section 17, and recording section 18, out of functions of the above server 1, together with the function of the controlling section 11, can be programmed in a form of a contents using program and the resulting programs are stored in a semiconductor memory such as a ROM or a like or in a storage medium such as an FD, HD, CD-ROM or a like. In this case, the contents using program is read from the storage medium into the controlling section 11 made up of CPUs and controls operations of the controlling section 11. The controlling section 11, when the contents using program is run, functions as the event monitoring section 14, task schedule managing section 15, image file transferring section 16, format converting section 17, and recording section 18 and performs the above processing under control of the contents using program.

What is claimed is:

1. A contents using method comprising:
   storing contents by a server at a date and at a time both being designated by a user;
   converting a quality of said contents by said server according to a storage capacity or a display capability of a storage section and a display section making up an electronic device, said storage capacity of said storage section being smaller than a storage capacity of said server; and
   transferring, after having confirmed a connection between said server and said electronic device, contents obtained after the quality conversion, from said server to said electronic device,
   wherein, when a transfer completion date and time at which said transfer of said contents is completed have been set by said user, in said converting, said server calculates a time required for said transfer and for said quality conversion by performing an inverse operation from said transfer completion date and time and sets a quality conversion starting date and time at which said conversion of quality is started, and starts said conversion of said quality of said contents at the set quality conversion starting time and date.

2. The contents using method according to claim 1, wherein said server and said electronic device are connected to each other through a cable, by wireless, or via a network.

3. The contents using method according to claim 1, wherein said electronic device comprises a portable electronic device to which power is supplied by a battery, a dry cell, a solar cell or a fuel cell.

4. The contents using method according to claim 3, wherein said portable electronic device comprises one of a notebook-type, a palm-size-type, a pocket-type computer, a PDA (Personal Digital Assistant), a portable cellular phone, and a PHS (Personal Handy-phone System).

5. The contents using method according to claim 1, wherein said electronic device comprises:
a first electronic device having said display section; and
a second electronic device having a controlling section to store contents obtained after said quality conversion transferred from said storage section and said server in said storage section and to display said contents on said display section.

6. The contents using method according to claim 1, wherein said electronic device comprises a first electronic device having said display section and said storage section and a second electronic device having a controlling section to store contents obtained after said quality conversion and transferred from said server in said storage section and to display said contents on said display section.

7. The contents using method according to claim 1, wherein
said server and said electronic device are connected to each other through a cradle serving as a platform having a function of connecting said electronic device to said server to carry out a data exchange, and
wherein, in said transferring, said server, after having confirmed that said electronic device has been inserted into said cradle, transfers contents obtained after said quality conversion to said electronic device.

8. The contents using method according to claim 1, wherein, in said converting, said storage capacity and said display capability are acquired as a result of having been pre-input in said electronic device by said user or as a result of having displayed contents serving as a sample which have been transferred to said electronic device and have been displayed on said display section when said server was first connected to said electronic device.

9. The contents using method according to claim 1, wherein, in said storing,
storage presetting information about presetting of storing said contents is input into said electronic device,
said electronic device transfers said storage presetting information to said server, and
said server stores said contents based on said storage presetting information.

10. The contents using method according to claim 9, wherein, in said storing,
said server transfers a contents acquiring schedule table needed to input said storage presetting information to said electronic device, and
said storage presetting information is input based on said contents acquiring schedule table in said electronic device.

11. The contents using method according to claim 9, wherein said storage presetting information contains at least one of:
information about a name of said contents,
a storage starting date and time,
a storage terminating date and time,
a transfer flag indicating whether or not a transfer is needed,
an identification number of a destination to which a transfer is made, where said identification number designates said destination to which said transfer is made, and
a quality conversion of said contents.

12. The contents using method according to claim 11, wherein,
when a plurality of said electronic devices exists and a device identification number is assigned to each of said electronic devices, said storage presetting information contains said device identification number, and
wherein, in said transferring, contents obtained after said quality conversion are transferred only to said electronic devices to which said device identification numbers have been assigned.

13. The contents using method according to claim 11, wherein, when a plurality of said users exists and a user identification number is assigned to each of said users, said storage presetting information contains said user identification numbers, and
wherein, in said transferring, contents obtained after said quality conversion are transferred only to said electronic device to which said storage presetting information containing said user identification numbers have been transferred in said storing.

14. The contents using method according to claim 11, wherein,
when said electronic device is constructed so that a plurality of said storage sections is freely detachable and attachable and a storage section identification number set by said user for each of said storage sections is assigned to each of said storage sections respectively, said storage presetting information contains said storage section identification number, and
in said transferring, contents obtained after said quality conversion are transferred only to said electronic devices each being equipped with said storage section to which said storage section identification numbers have been assigned.

15. The contents using method according to claim 11, wherein, in said converting, when a plurality of information about said quality conversion exists for said contents having same contents, said quality of said contents is converted so as to have a highest quality.

16. The contents using method according to claim 1, wherein, in said converting, said server converts said quality of said contents during a conversion enabling time band being not used by said user.

17. The contents using method according to claim 16, wherein said conversion enabling time band is set by said user in advance, or by said server based on a state of use of said server by said user in a past, or by said server based on a time band set in advance by said user and said state of use of said server.

18. The contents using method according to claim 1, wherein, in said converting, said server starts said conversion of said quality of said contents from a conversion start enabling date and time being an earliest date and time at which a time being expected to be required for said conversion of quality of said contents is able to be secured.

19. The contents using method according to claim 1, wherein, in said storing, said contents are divided into a plurality of elements and stored,
wherein, in said converting, said quality of said plurality of said elements is sequentially converted, and wherein, in said transferring, said plurality of elements obtained after said quality conversion is sequentially transferred from said server to said electronic device.

20. The contents using method according to claim 19, wherein, in said converting, when said conversion of said quality of an arbitrary one of said plurality of elements is discontinued while said quality of said plurality of elements is being sequentially converted, said conversion of said quality is restarted from said arbitrary one from which said conversion had been discontinued after a normal operation is restored.

21. The contents using method according to claim 20, wherein, in said converting, when said conversion of said quality of an arbitrary one of said plurality of elements becomes successful, said arbitrary one being stored in said server is deleted.

22. The contents using method according to claim 19, wherein, in said transferring, when said transfer of an arbitrary one of said plurality of elements is discontinued while said plurality of said elements obtained after said quality conversion is sequentially transferred, said transfer is restarted from said arbitrary one from which said transfer had been discontinued after a normal operation is restored.

23. The contents using method according to claim 22, wherein, in said transferring, when said transfer of an arbitrary element of said plurality of elements becomes successful, said arbitrary one being stored in said server is deleted.

24. The contents using method according to claim 1, wherein, in said transferring, when a free disk space of said storage capacity is not enough to store said contents or said elements, said contents or said elements to be deleted under specified conditions set in advance are sequentially selected and deleted, out of a plurality of said contents or said elements being stored in said storage section, until said free disk space of said storage capacity is increased so as to become enough to store said contents or said elements.

25. The contents using method according to claim 1, wherein, in said transferring, when a free disk space of said storage capacity is not enough to store said contents or said elements, said contents or said elements to be transferred under specified conditions set in advance are sequentially selected and transferred, out of a plurality of said contents or said elements being stored in said storage section, until said free disk space of said storage capacity is increased so as to become enough to store said contents or said elements.

26. The contents using method according to claim 1, wherein, in said transferring, when a free disk space of said storage capacity is not enough to store said contents or said elements, a part of a plurality of said contents or said elements being stored in said storage section is sequentially displayed on said display section or a display section of said server and said contents or said elements being sequentially selected by said user are sequentially deleted until said free disk space of said storage capacity is increased so as to become enough to store said contents or said elements.

27. The contents using method according to claim 1, wherein, in said transferring, when a free disk space of said storage capacity is not enough to store said contents or said elements, said contents or said elements having same contents as said contents or said elements being stored in said server, out of a plurality of said contents or said elements being stored in said storage section, are sequentially selected for deletion until said free disk space of said storage capacity is increased so as to become enough to store said contents or said elements.

28. The contents using method according to claim 1, wherein, in said transferring, when a free disk space of said storage capacity is not enough to store said contents or said elements, said contents or said elements to be deleted based on predetermined conditions set in advance are sequentially selected for deletion, out of a plurality of said contents or said elements having been reproduced and being stored in said storage section of said electronic device, until said free disk space of said storage capacity is increased so as to become enough to store said contents or said elements.

29. The contents using method according to claim 1, wherein, in said converting, when a use of said server by said user is detected, said server does not start or discontinues said conversion of said quality of said contents and said elements.

30. The contents using method according to claim 29, wherein, in said converting, when said use of said server by said user is not detected for a period of time exceeding a predetermined time, said server starts or restarts said conversion of said quality of said contents or said elements.

31. The contents using method according to claim 29, wherein said use of said server by said user is judged or confirmed by identifying said user, by detecting a fact that an operating section of said server has been manipulated by said user, or by detecting an intention of said user to use said server.

32. The contents using method according to claim 29, wherein, in said converting or said transferring, said quality conversion of said contents or said elements, or said transfer of said contents or said elements obtained after said quality conversion is stopped or discontinued when a load on a controlling section of said server exceeds a threshold value for a first period of time within a first predetermined period, and is started or restarted when said load on said controlling section becomes less than a threshold value for a second period of time within a second predetermined period.

33. The contents using method according to claim 1, wherein, in said transferring, when a use of said server by said user is detected, said server does not start or discontinues said transfer of said contents or said elements obtained after said quality conversion.

34. The contents using method according to claim 31, wherein, in said transferring, when said use of said server by said user is not detected for a period of time exceeding a predetermined time, said server starts or restarts said transfer of said contents or said elements obtained after said quality conversion.

35. The contents using method according to claim 1, wherein said server is so constructed that said contents or said elements are able to be reproduced and wherein, in said transferring, said server transfers said contents or said elements obtained after said quality conversion and a reproduction point of said contents or said elements obtained after said quality conversion to said electronic device, and further comprising a reproducing in which said contents or said elements obtained after said quality conversion are reproduced from said reproduction point by said electronic device.

36. The contents using method according to claim 35, further comprising a reproduction point transferring of transferring, when said contents or said elements having same contents as said contents or said element being stored in said storage section of said electronic device are stored in said storage section of said server at a time when said server is connected to said electronic device, said reproduction point currently existing from said electronic device to said server and of storing said reproduction point currently existing in said storage section of said server or of renewing said reproduction point.

37. A contents using system comprising:
a server to store contents and to transfer said contents to an electronic device and to reproduce said contents by said electronic device,
wherein said server stores said contents at a date and at a time both being designated by a user, converts a quality of said contents according to a storage capacity or a display capability of a storage section and a display section comprising said electronic device, said storage capacity of said storage section being smaller than a storage capacity of said server, and transfers, after having confirmed a connection between said server and said electronic device, said contents obtained after the quality conversion, from said server to said electronic device,
wherein, when a transfer completion date and time at which said transfer of said contents is completed have been set by said user, said server calculates a time required for said transfer and for said quality conversion by performing an inverse operation from said transfer completion date and time and sets a quality conversion starting date and time at which said conversion of quality is started, and starts said conversion of said quality of said contents at the set quality conversion starting date and time.

38. The contents using system according to claim 37, wherein said server and said electronic device are connected to each other through a cable, by wireless, or via a network.

39. The contents using system according to claim 37, wherein said electronic device comprises a portable electronic device to which power is supplied by a battery, a dry cell, a solar cell or a fuel cell.

40. The contents using system according to claim 39, wherein said portable electronic device comprises one of a notebook-type, a palm-size-type, a pocket-type computer, a PDA (Personal Digital Assistant), a portable cellular phone, and a PHS (Personal Handy-phone System).

41. The contents using system according to claim 37, wherein said electronic device comprises a first electronic device having said display section and a second electronic device having a controlling section to store said contents obtained after said quality conversion and transferred from said storage section and said server in said storage section and to display said contents on said display section.

42. The contents using system according to claim 37, wherein said electronic device comprises a first electronic device having said display section and said storage section and a second electronic device having a controlling section to store said contents obtained after said quality conversion and transferred from said server in said storage section and to display said contents on said display section.

43. The contents using system according to claim 37, wherein said server and said electronic device are connected to each other through a cradle serving as a platform having a function of connecting said electronic device to said server to carry out a data exchange and wherein said server, after having confirmed that said electronic device has been inserted into said cradle, transfers said contents obtained after said quality conversion to said electronic device.

44. The contents using system according to claim 37, wherein said storage capacity and said display capability are acquired as a result of pre-inputting by said user or as a result of displaying contents serving as a sample which have been transferred to said electronic device and have been displayed on said display section when said server was first connected to said electronic device.

45. The contents using system according to claim 37, wherein said electronic device transfers storage presetting information about presetting of storing said contents input by said user and said server stores said contents based on said storage presetting information.

46. The contents using system according to claim 45, wherein said server transfers a contents acquiring schedule table needed to input said storage presetting information to said electronic device and said electronic device transfers said storage presetting information input by said user who made reference to said contents acquiring schedule table.

47. The contents using system according to claim 45, wherein said storage presetting information contains at least one of:
information about a name of said contents,
a storage starting date and time,
a storage terminating date and time,
a transfer flag indicating whether or not a transfer is needed,
an identification number of a destination to which a transfer is made which designates said destination to which said transfer is made, and
a quality conversion of said contents.

48. The contents using system according to claim 47,
wherein, when a plurality of said electronic devices exists and a device identification number is assigned to each of said electronic devices, said storage presetting information contains said device identification numbers, and
wherein said server transfers said contents obtained after said quality conversion only to said electronic devices to which said device identification numbers have been assigned.

49. The contents using system according to claim 47,
wherein, when a plurality of said users exists and a user identification number is assigned to each of said users, said storage presetting information contains said user identification numbers, and
wherein said server transfers said contents obtained after said quality conversion only to said electronic device to which said storage presetting information containing said user identification numbers have been transferred.

50. The contents using system according to claim 47, wherein, when said electronic device is configured so that a plurality of said storage sections is freely detachable and attachable and a storage section identification number set by said user for each of said storage sections is assigned to said storage section, said storage presetting information contains said storage section identification numbers and said server transfers contents obtained after said quality conversion only to said electronic devices each being equipped with said storage section to which said storage section identification number has been assigned.

51. The contents using system according to claim 47, wherein, when a plurality of information about said quality conversion exists for said contents having same contents, said quality of said contents is converted so as to have a highest quality.

52. The contents using system according to claim 37, wherein said server converts said quality of said contents during a conversion enabling time band being not used by said user.

53. The contents using system according to claim 52, wherein said conversion enabling time band is set by said user in advance, or by said server based on a state of use of said server by said user in a past, or by said server based on a time band set in advance by said user and said state of use of said server.

54. The contents using system according to claim 37, wherein said server starts said conversion of said quality of said contents from a conversion start enabling date and time being an earliest date and time at which a time being expected to be required for said conversion of said quality of said contents is able to be secured.

55. The contents using system according to claim 37, wherein said server divides said contents into a plurality of elements, stores said plurality of elements, sequentially converts said quality of said plurality of said elements, and sequentially transfers said plurality of said elements obtained after said quality conversion, from said server to said electronic device.

56. The contents using system according to claim 55, wherein, when said conversion of said quality of an arbitrary one of said plurality of elements is discontinued while said quality of said plurality of said elements is being sequentially converted, said conversion of said quality is restarted from said arbitrary one from which said conversion had been discontinued, after a normal operation is restored.

57. The contents using system according to claim 56, wherein said server, when said conversion of said quality of an arbitrary one of said plurality of elements becomes successful, deletes said arbitrary one being stored in said storage section of said server.

58. The contents using system according to claim 55, wherein said server, when said transfer of an arbitrary one of said plurality of elements is discontinued while said plurality of said elements obtained after said quality conversion is sequentially transferred, restarts said transfer from said arbitrary one from which said transfer had been discontinued, after a normal operation is restored.

59. The contents using system according to claim 58, wherein said server, when said transfer of said arbitrary one of said plurality of elements becomes successful, deletes said arbitrary one being stored in said storage section of said server.

60. The contents using system according to claim 37, wherein said server, when a free disk space of said storage capacity is not enough to store said contents or said elements, sequentially selects and deletes said contents or said elements to be deleted under specified conditions set in advance, out of a plurality of said contents or said elements being stored in said storage section of said electronic device, until said free disk space of said storage capacity is increased so as to become enough to store said contents or said elements.

61. The contents using system according to claim 37, wherein said server, when a free disk space of said storage capacity is not enough to store said contents or said elements, sequentially selects said contents or said elements to be transferred to said server itself under specified conditions set in advance so as to be transferred to said server itself, out of a plurality of said contents or said elements being stored in said storage section of said electronic device, until said free disk space of said storage capacity is increased so as to become enough to store said contents or said elements.

62. The contents using system according to claim 37, wherein said server, when a free disk space of said storage capacity is not enough to store said contents or said elements, sequentially displays part of a plurality of said contents or said elements being stored in said storage section of said electronic device on said display section or a display section of said server itself and sequentially deletes said contents or said elements being sequentially selected by said user until said free disk space of said storage capacity is increased so as to become enough to store said contents or said elements.

63. The contents using system according to claim 37, wherein said sever, when a free disk space of said storage capacity is not enough to store said contents or said elements, sequentially selects and deletes said contents or said elements having same contents as said contents or said elements being stored in a storage section of said server itself, out of a plurality of said contents or said elements being stored in said storage section of said electronic device, until said free disk space of said storage capacity is increased so as to become enough to store said contents or said elements.

64. The contents using system according to claim 37, wherein said server, when a free disk space of said storage capacity is not enough to store said contents or said elements, sequentially selects and deletes said contents or said elements to be deleted based on specified conditions set in advance, out of a plurality of said contents or said elements having been reproduced and being stored in said storage section of said electronic device, until said free disk space of said storage capacity is increased so as to become enough to store said contents or said elements.

65. The contents using system according to claim 37, wherein said server, when a use of said server by said user is detected, does not start or discontinues said conversion of said quality of said contents and said elements.

66. The contents using system according to claim 65, wherein said server, when said use of said server by said user is not detected for a period of time exceeding a predetermined time, starts or restarts said conversion of said quality of said contents or said elements.

67. The contents using system according to claim 65, wherein said server determines said use of said server by said user, by identifying said user, by detecting a fact that an operating section of said server has been manipulated by said user, or by detecting an intention of said server to use said server.

68. The contents using system according to claim 65, wherein said server:
 stops or discontinues said quality conversion of said contents or elements, or said transfer of said contents or said elements obtained after said conversion, when a load on a controlling section of said server exceeds a first threshold value for a first period of time within a first predetermined period; and
 starts or restarts said quality conversion of said contents or said elements, or transfer of said contents or elements obtained after said quality conversion when said load on said controlling section becomes less than a second threshold value for a second period of time within a second predetermined period.

69. The contents using system according to claim 37, wherein said server, when a use of said server by said user is detected, does not start or discontinues said transfer of said contents or said elements obtained after said quality conversion.

70. The contents using system according to claim 69, wherein said server, when said use of said server by said user is not detected for a period of time exceeding a predetermined time, starts or restarts said transfer of said contents or said elements obtained after said quality conversion.

71. The contents using system according to claim 37,
 wherein said server is so constructed that said contents or said elements are able to be reproduced,
 wherein said server transfers said contents or said elements obtained after said quality conversion by said server and a reproduction point of said contents or said elements obtained after said quality conversion to said electronic device, and
 wherein said electronic device reproduces said contents or said elements obtained after said quality conversion from said reproduction point.

72. The contents using system according to claim 71, wherein, when said contents or said elements having same contents as said contents or said elements being stored-in said storage section of said electronic device are stored in said storage section of said server at a time when said server is connected to said electronic device, said server receives a reproduction point currently existing transferred from said electronic device and stores or renews said reproduction point currently existing in said storage section of said server itself.

73. A contents using system in which a plurality of servers is connected through a network and which transfers contents, after having stored them by a server and reproduces said contents by an electronic device, wherein each of a plurality of said servers comprises said server as recited in claim 37.

74. A contents using system in which a plurality of servers is connected through a network and which transfers contents, after having stored them by a server and reproduces said contents by an electronic device, wherein an electronic device comprises said electronic devices as recited in claim 37 and is configured so as to be capable of being connected to said network through any one of a plurality of said servers or directly.

75. A server for being used in said contents using system as recited in claim 37.

76. An electronic device for being used in said contents using system as recited in claim 37.

77. A non-transitory computer-readable storage medium encoded with a computer program to have a computer to execute contents using a method, said method comprising:

storing contents by a server at a date and at a time both being designated by a user;

converting quality of said contents by said server according to storage capacity or display capability of a storage section and display section making up an electronic device, said storage capacity of said storage section being smaller than a storage capacity of said server; and transferring, after having confirmed connection between said server and said electronic device, contents obtained after the quality conversion, from said server to said electronic device, wherein, when a transfer completion date and time at which said transfer of said contents is completed have been set by said user, in said converting, said server calculates a time required for said transfer and for said quality conversion by performing an inverse operation from said transfer completion date and time and sets a quality conversion starting date and time at which said conversion of quality is started, and starts said conversion of said quality of said contents at the set quality conversion starting date and time.

* * * * *